March 17, 1931.  G. GODDU  1,796,451
LASTING MACHINE
Filed Sept. 28, 1926  9 Sheets-Sheet 1

INVENTOR.
George Goddu
By his Attorney,
Nelson W. Howard

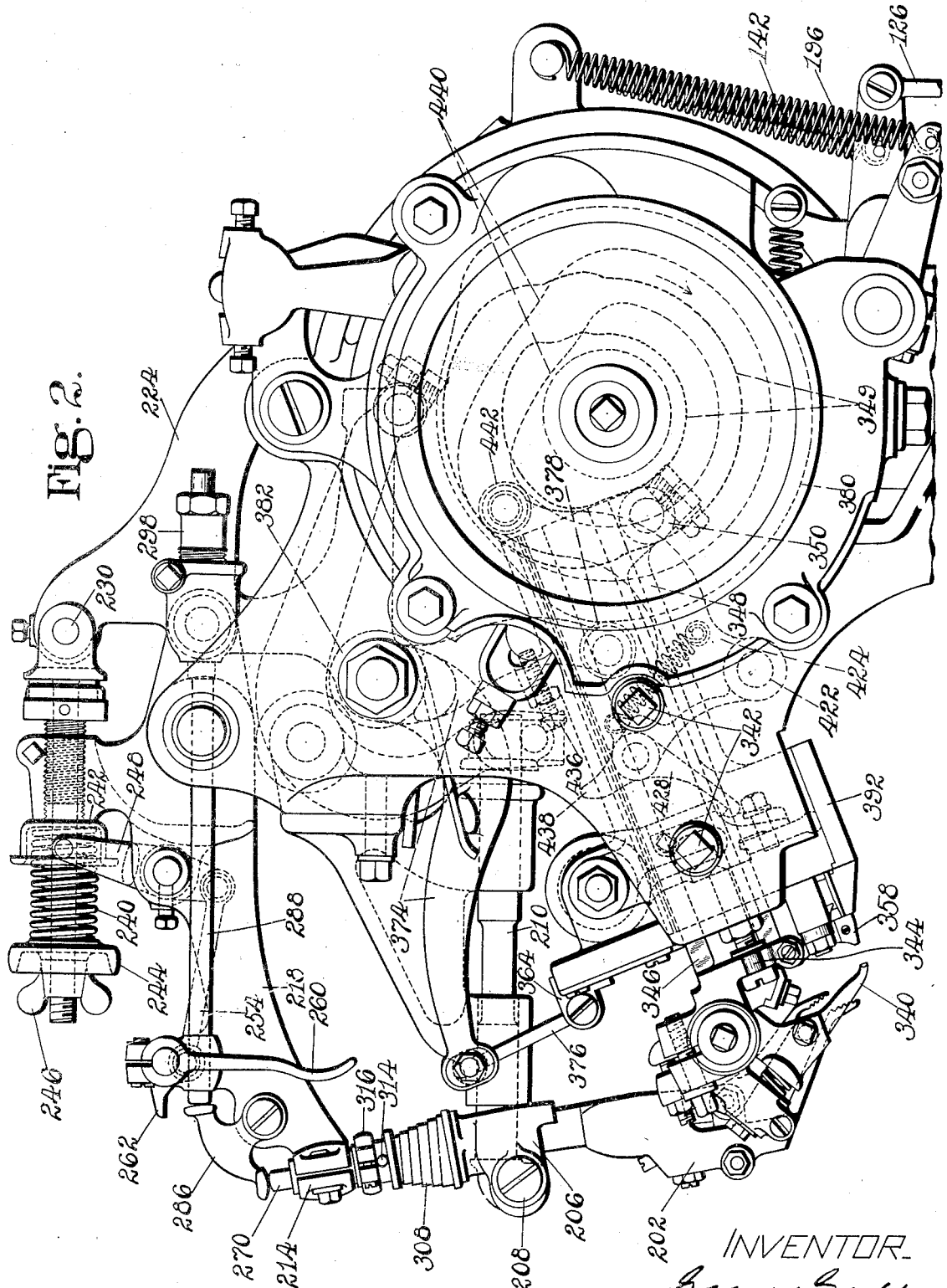

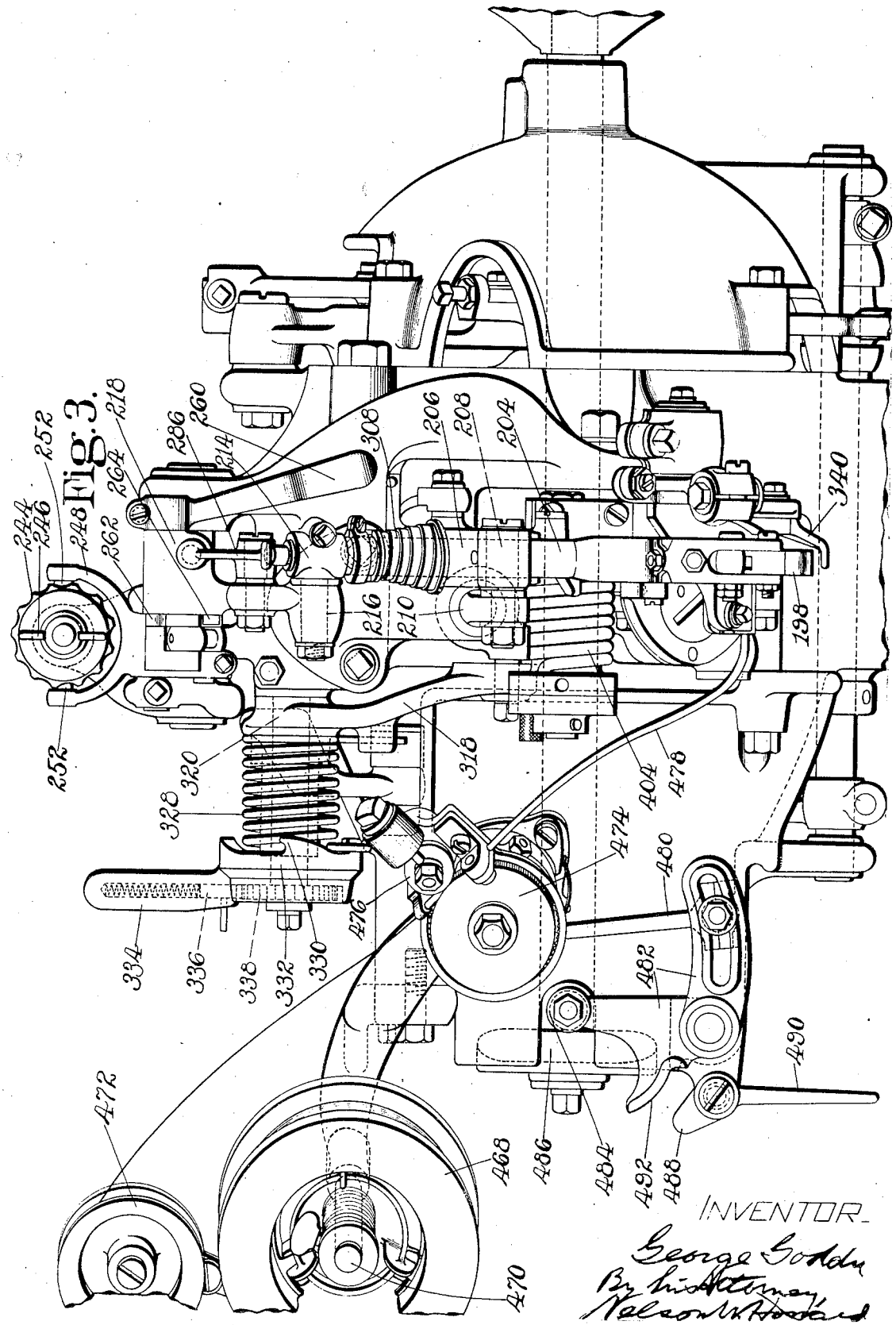

March 17, 1931. G. GODDU 1,796,451
LASTING MACHINE
Filed Sept. 28, 1926 9 Sheets-Sheet 4

INVENTOR.
George Goddu
By his Attorney
Nelson W Howard

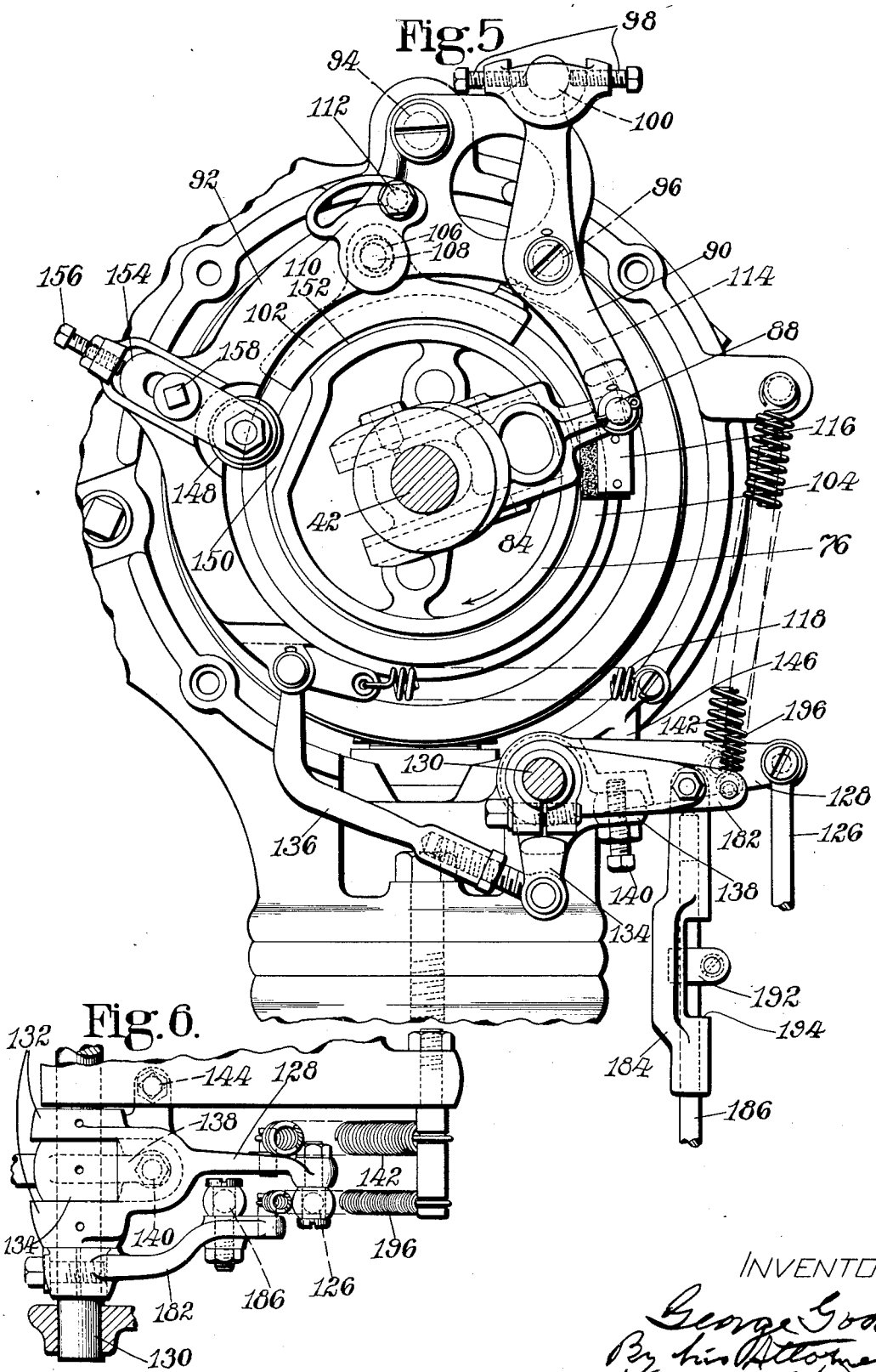

March 17, 1931.  G. GODDU  1,796,451
LASTING MACHINE
Filed Sept. 28, 1926   9 Sheets-Sheet 6
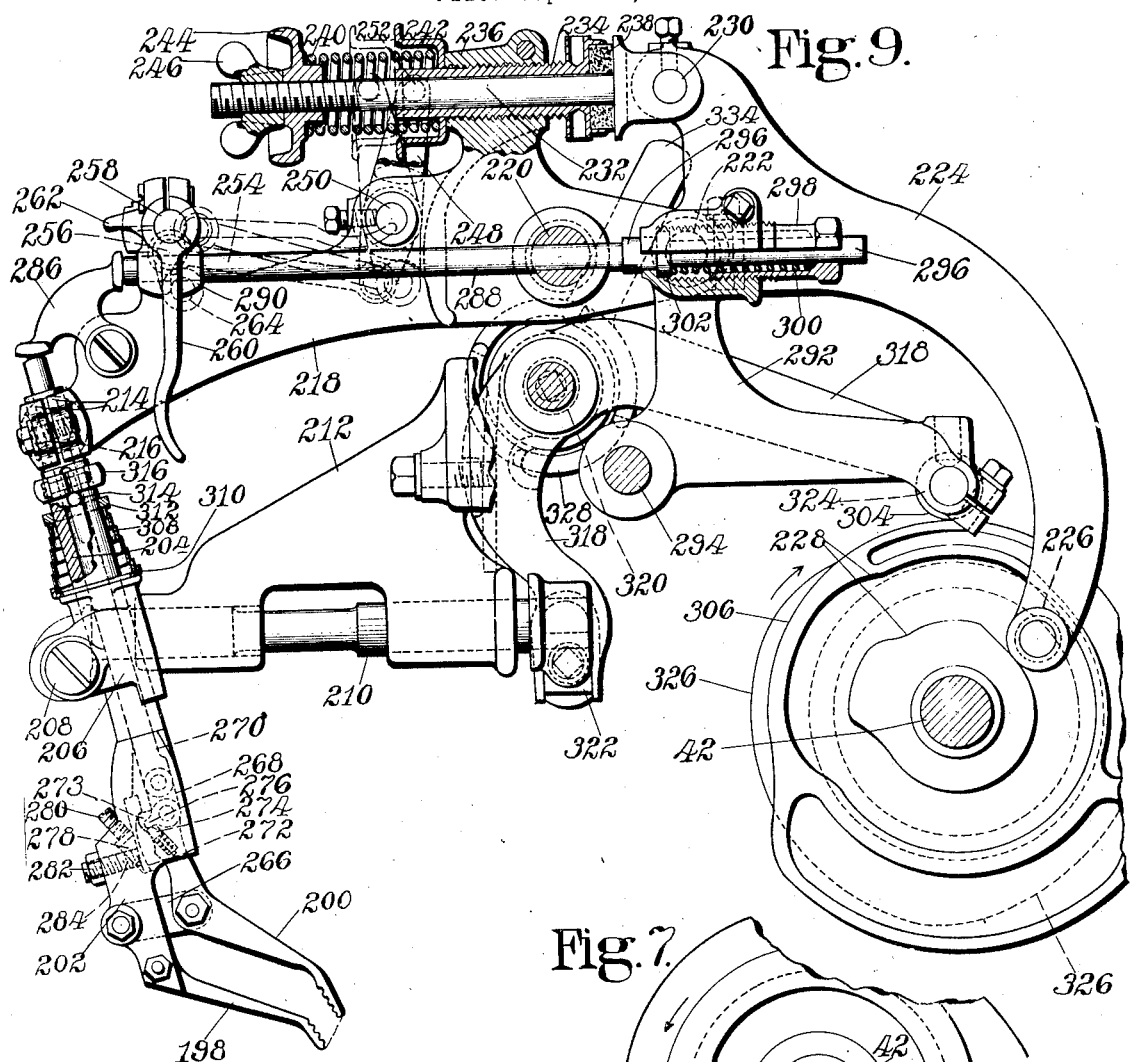
Fig. 9.
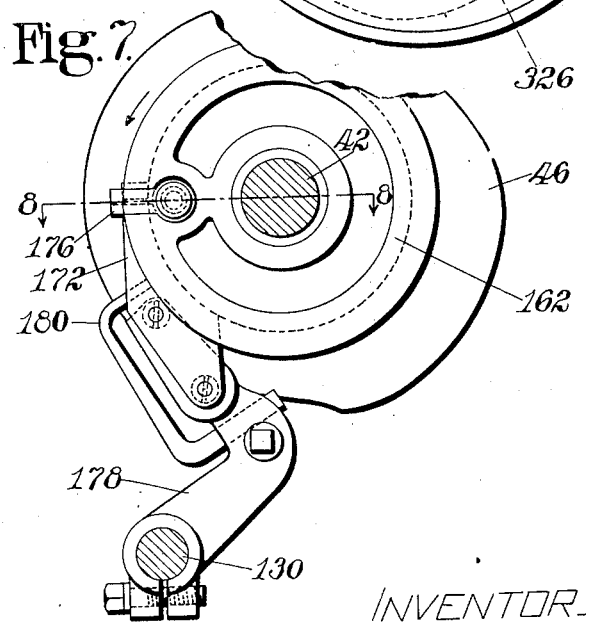
Fig. 7.
Fig. 8.
INVENTOR.
George Goddu
By his Attorney

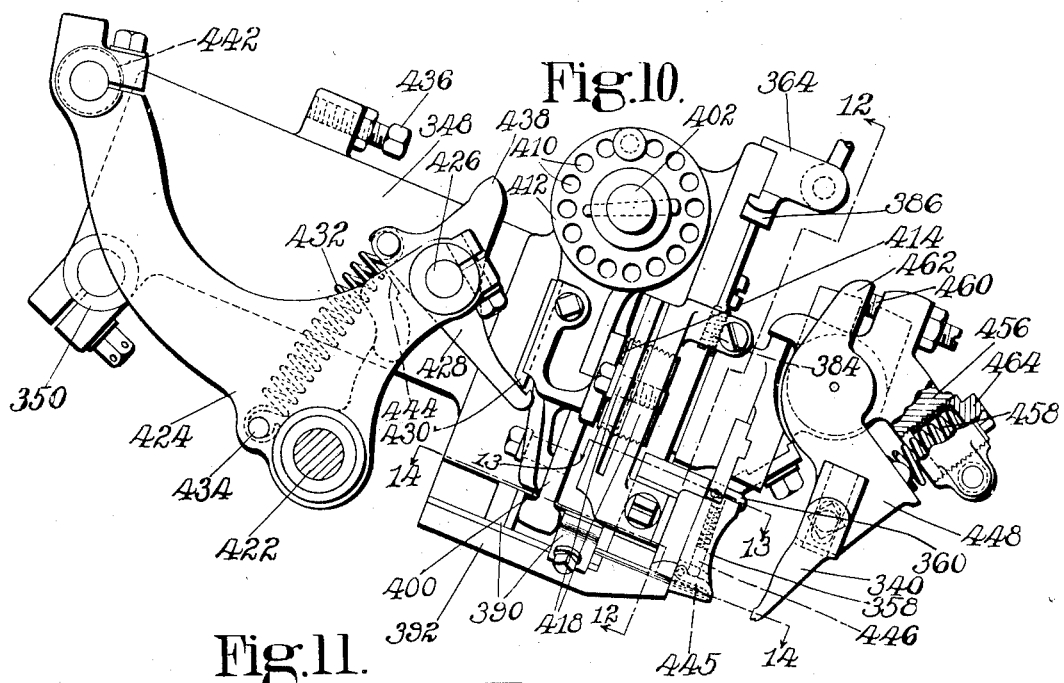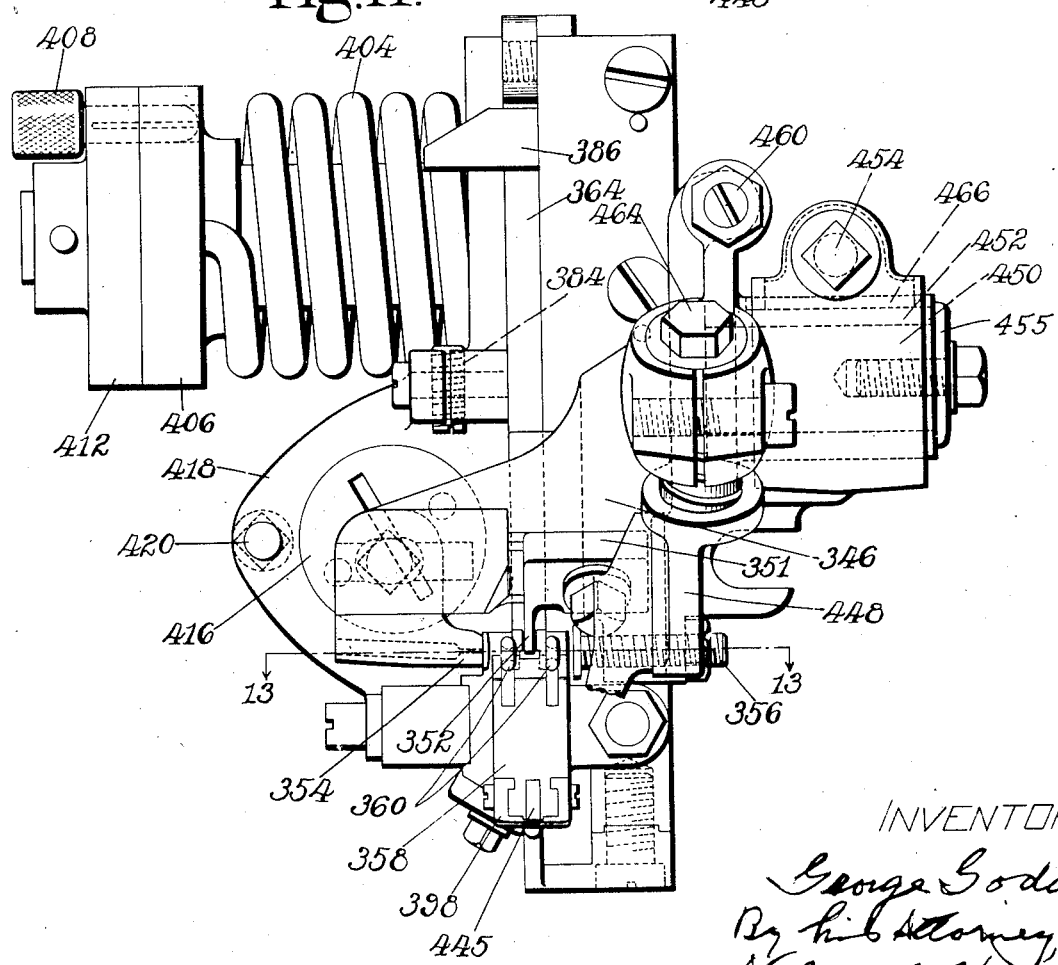

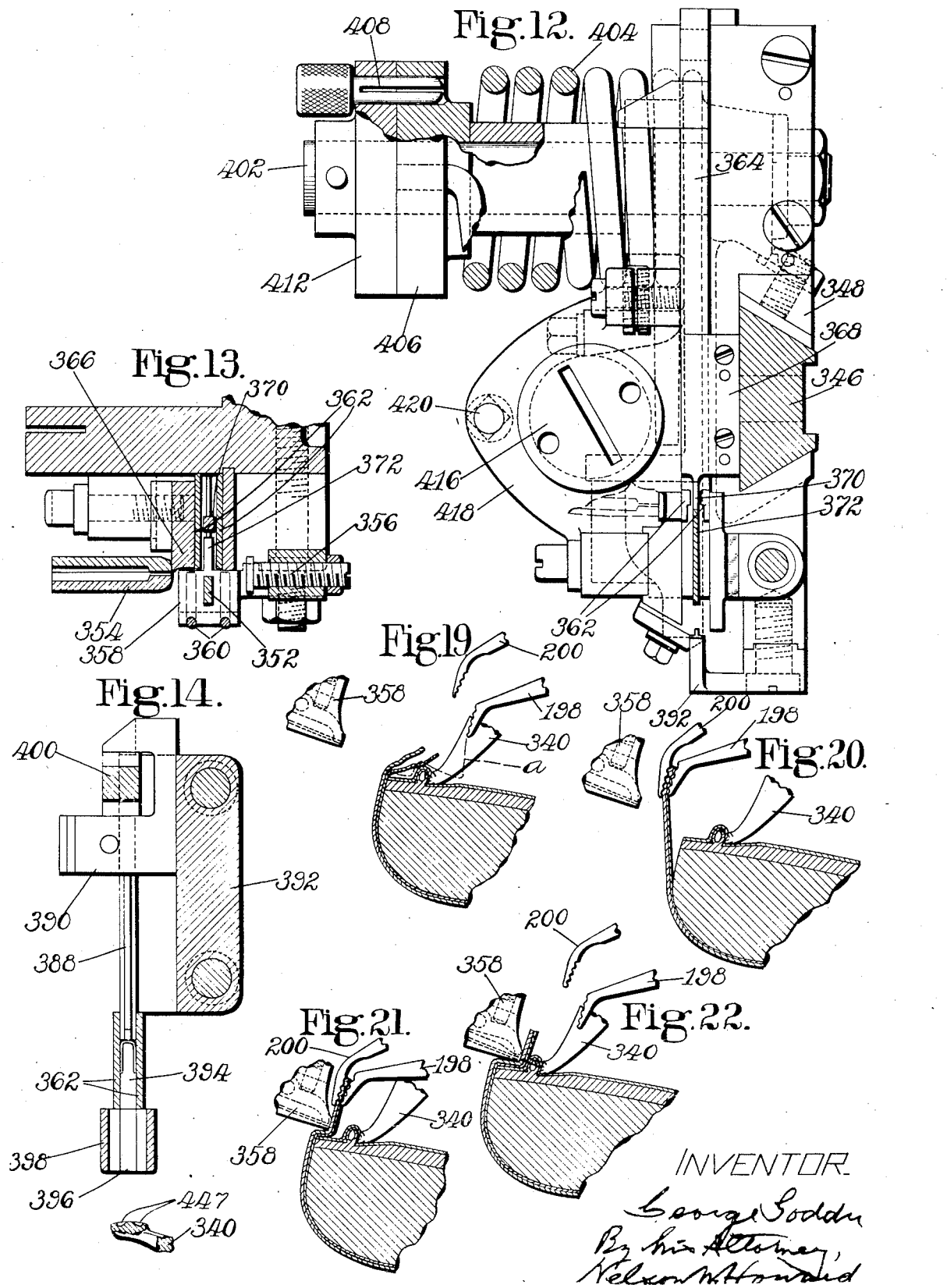

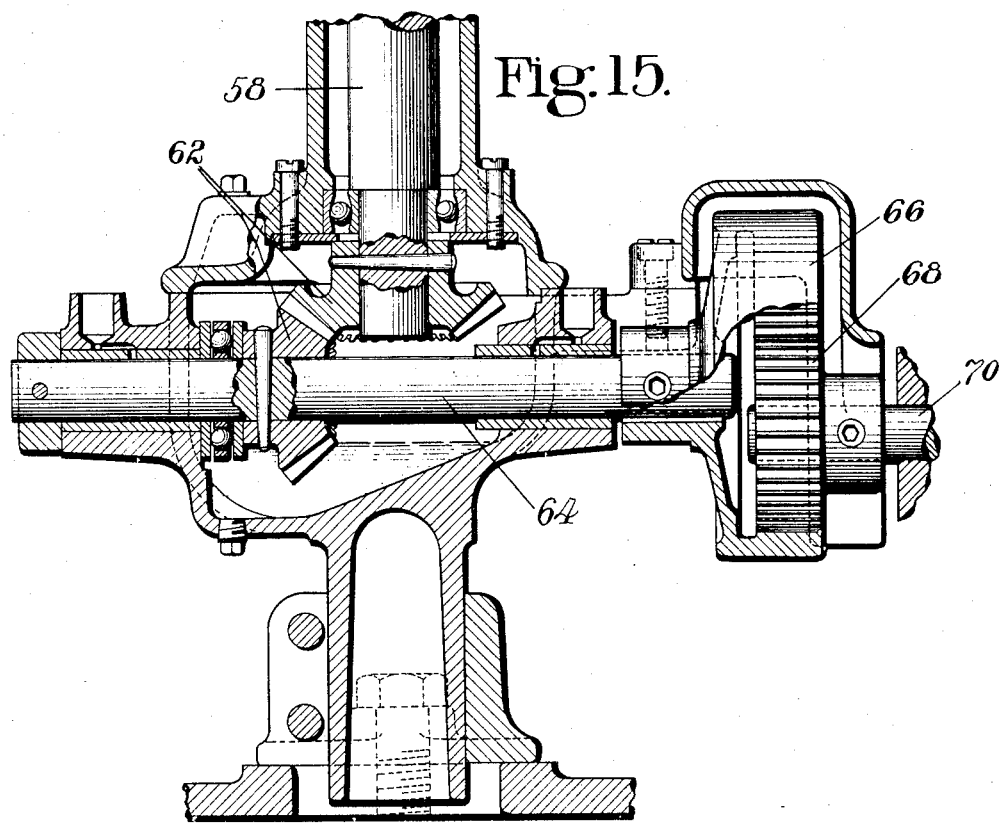
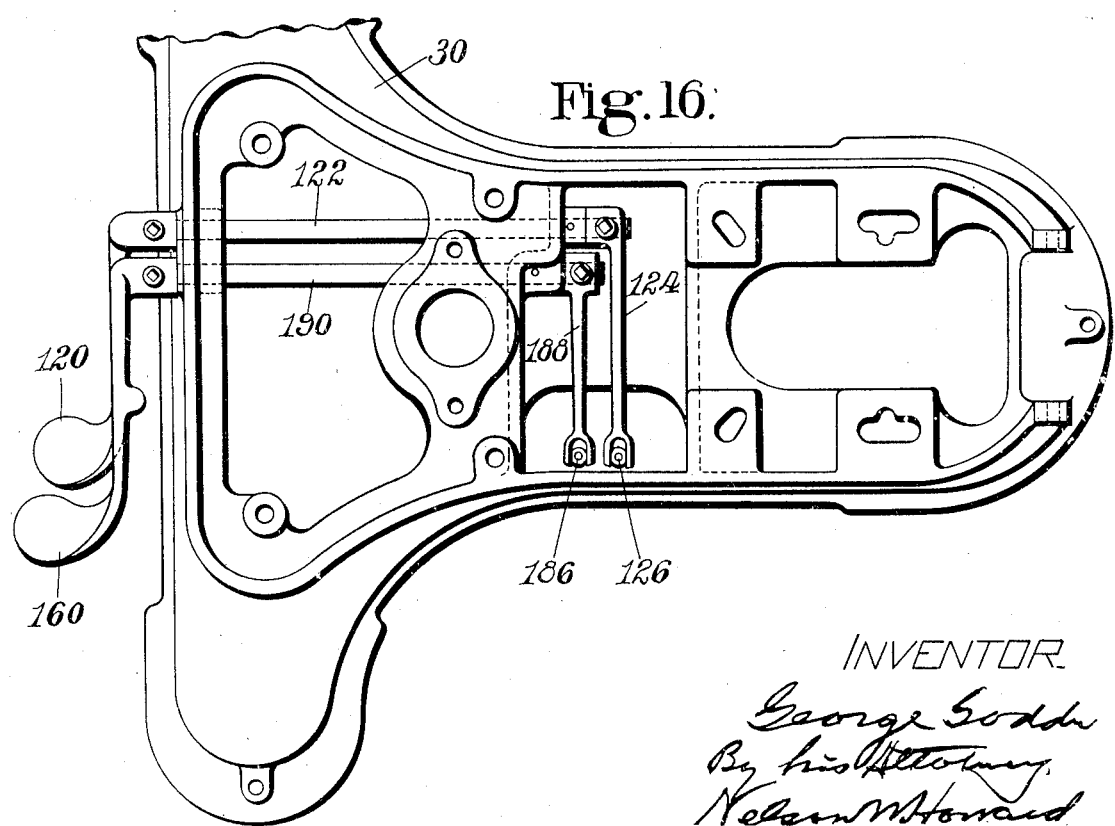

Patented Mar. 17, 1931

1,796,451

UNITED STATES PATENT OFFICE

GEORGE GODDU, OF WINCHESTER, MASSACHUSETTS, ASSIGNOR TO UNITED SHOE MACHINERY CORPORATION, OF PATERSON, NEW JERSEY, A CORPORATION OF NEW JERSEY

LASTING MACHINE

Application filed September 28, 1926, Serial No. 138,300, and in Great Britain July 15, 1926.

This invention relates to machines for use in the manufacture of boots and shoes for shaping uppers over lasts, and is herein illustrated in its application to a machine for lasting different portions of a shoe successively, including means for gripping and pulling the upper and for laying its margin inwardly over the insole and fastening it by staples in the same general manner as disclosed in Letters Patent No. 1,731,853, granted upon an earlier application of mine on Oct. 15, 1929. It will be recognized, however, that in various novel and useful aspects the invention is not limited to machines of the particular type illustrated.

One object of the invention is to provide means for operating an upper-pulling gripper in such manner as practically to insure that the gripper jaws will, under all conditions, properly grip the upper materials. In the use of machines for lasting different portions of a shoe successively the margin of the upper materials is frequently inclined more or less inwardly over the insole, so that the lining especially may lie close to the bottom of the insole where there is danger that the gripper jaws may not properly seize it. The present invention provides a construction such that the gripper, before moving outwardly over the shoe toward the edge of the insole into position to grip the upper materials, is moved into close relation to the bottom face of the insole, so that in moving outwardly toward the edge the gripper jaws will properly receive between them the different layers of upper materials, including the lining. As herein illustrated especially in relation to welt shoe work, the gripper is moved first into a position where one jaw may be closer to the plane of the insole than the top of the insole lip or rib, and is then moved outwardly and away from said plane to insure clearing the rib, with a further movement outwardly and toward said plane outside of the rib.

In the pulling of the upper heightwise of the last it is desirable to avoid contact of the upper with the edge of the insole, such as might result in the raising of the margin of the insole from the bottom of the last. To this end, the machine herein shown is further provided with means which is operative independently of the updraw movement of the gripper to impart to the gripper movement in a direction to pull the upper outwardly from the side of the last and the edge of the the insole. The gripper thus receives a distinct outdraw movement in addition to its updraw movement, thereby insuring that the upper will clear the edge of the insole irrespective of such variation as there may be in the position in which the operator presents the shoe.

In accordance with a further feature, the gripper herein shown is so mounted that in its overdrawing movement, whereby it pulls the margin of the upper inwardly over the insole, it swings about an axis so arranged that the gripper jaws approach the bottom face of the insole. It is desirable that the gripper maintain its hold on the upper until the upper has been firmly pressed against the insole by the overlaying means, especially in an organization such as illustrated in which the overlaying member moves in a direction inclined toward the plane of the insole; and the overdrawing movement of the gripper jaws thus taking place in such manner as to approach the plane of the insole facilitates the overlaying operation without relaxing the tension under which the upper is held by the gripper.

Still other features of the invention, relating especially to the upper-pulling means, are to be recognized in a novel organization of gripper-operating and controlling mechanism, having particularly in view a simple, compact and conveniently accessible arrangement of parts. For imparting to the gripper its updraw movement there is provided a two-part updraw lever of novel construction, with a spring affording a yielding connection between the two parts of the lever. In the construction shown the spring extends forwardly in a substantially horizontal direction toward the operator's working position and is provided at its front end with a tension-adjusting nut which the operator may conveniently reach in his working position. Additional novel means is further provided for effecting a quick adjustment of the tension of the spring, this means, in the construction shown, including a hand lever mounted on the front end portion of the up-draw lever. Included in this part of the invention are also novel mechanisms for effecting relative closing movement of the gripper jaws and for imparting to the gripper its overdrawing movement.

It is desirable on some parts of a shoe to fasten the upper without pulling it, and the invention further provides a novel organization for accomplishing this result. Considering the invention in one novel aspect, the gripper in the machine herein shown is so controlled that all its movements are eliminated when the machine is to be used only for fastening the upper. This is effected by the provision of separate clutches, one for controlling the different movements of the gripper and the other for controlling the fastening mechanism, with means that may be used at will to actuate the clutch for the fastening mechanism independently of the gripper clutch. Conveniently a treadle is utilized for actuating both clutches when the machine is to be used for both pulling and fastening the upper, and another treadle for actuating the clutch for the fastening mechanism alone when it is desired only to fasten the upper.

Included among other features are novel means affording provision for yield of an anvil member which clinches the fastenings, novel means for guiding the staples as they are driven, and various novel details of construction and combinations of parts, all of which will now be more particularly described by reference to the accompanying drawings and pointed out in the claims.

In the drawings,

Fig. 2 shows the head portion of the machine in right-hand side elevation on a larger scale;

Fig. 3 is a front elevation of the head of the machine;

Fig. 5 is a right-hand side elevation of a portion of the starting and stopping mechanism;

Fig. 6 is a plan view of parts of the starting and stopping mechanism shown in Fig. 5;

Fig. 7 is a section on the line 7—7 of Fig. 4, showing additional mechanism for controlling the operation of the machine;

Fig. 8 is a section on the line 8—8 of Fig. 7;

Fig. 9 is a view partly in right-hand side elevation and partly in section, showing the gripper and its operating means;

Fig. 10 is a left-hand side elevation of the stapling mechanism;

Fig. 11 shows the stapling mechanism in front elevation;

Fig. 12 is a section on the line 12—12 of Fig. 10;

Fig. 13 is a section on the line 13—13 of Figs. 10 and 11;

Fig. 14 is a section on the line 14—14 of Fig. 10;

Fig. 15 is a vertical section through a portion of the power-driving mechanism;

Fig. 16 is a plan view of the base of the machine;

Figs. 19, 20, 21 and 22 illustrate different successive positions of the upper-pulling and fastening instrumentalities in the operation of the machine upon a shoe.

Figure 1:
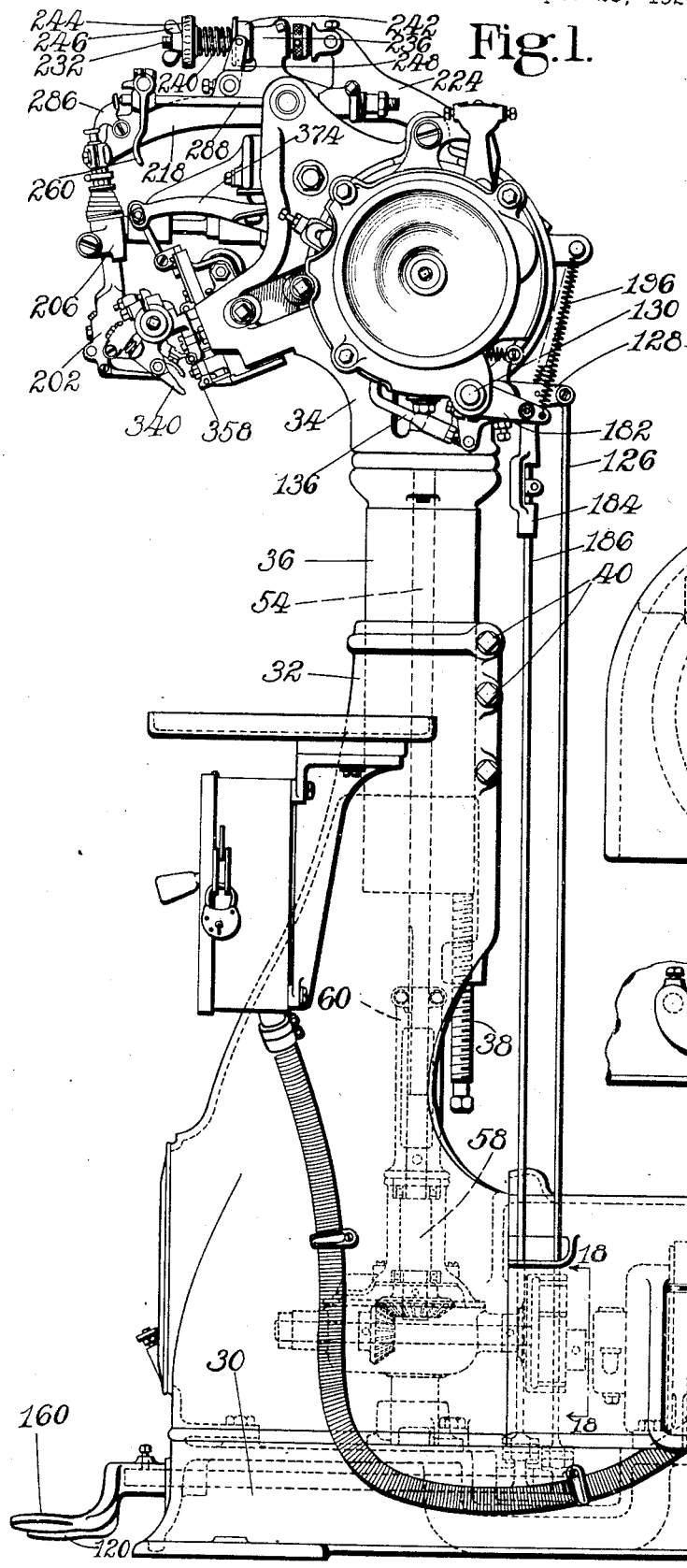
Fig. 1 is a view in right-hand side elevation of a machine in which the invention is embodied.

The machine comprises a base 30 upon which is mounted an upright hollow column 32 which supports a head 34 provided with a depending shank 36 vertically adjustable in a split bearing formed in the upper end of the column. The lower end of the shank 36 rests upon the upper end of a screw 38 which is threaded in the column 32 for adjusting the head 34 vertically. After the adjustment the shank 36 is secured in the column by clamping screws 40.

Figure 4:
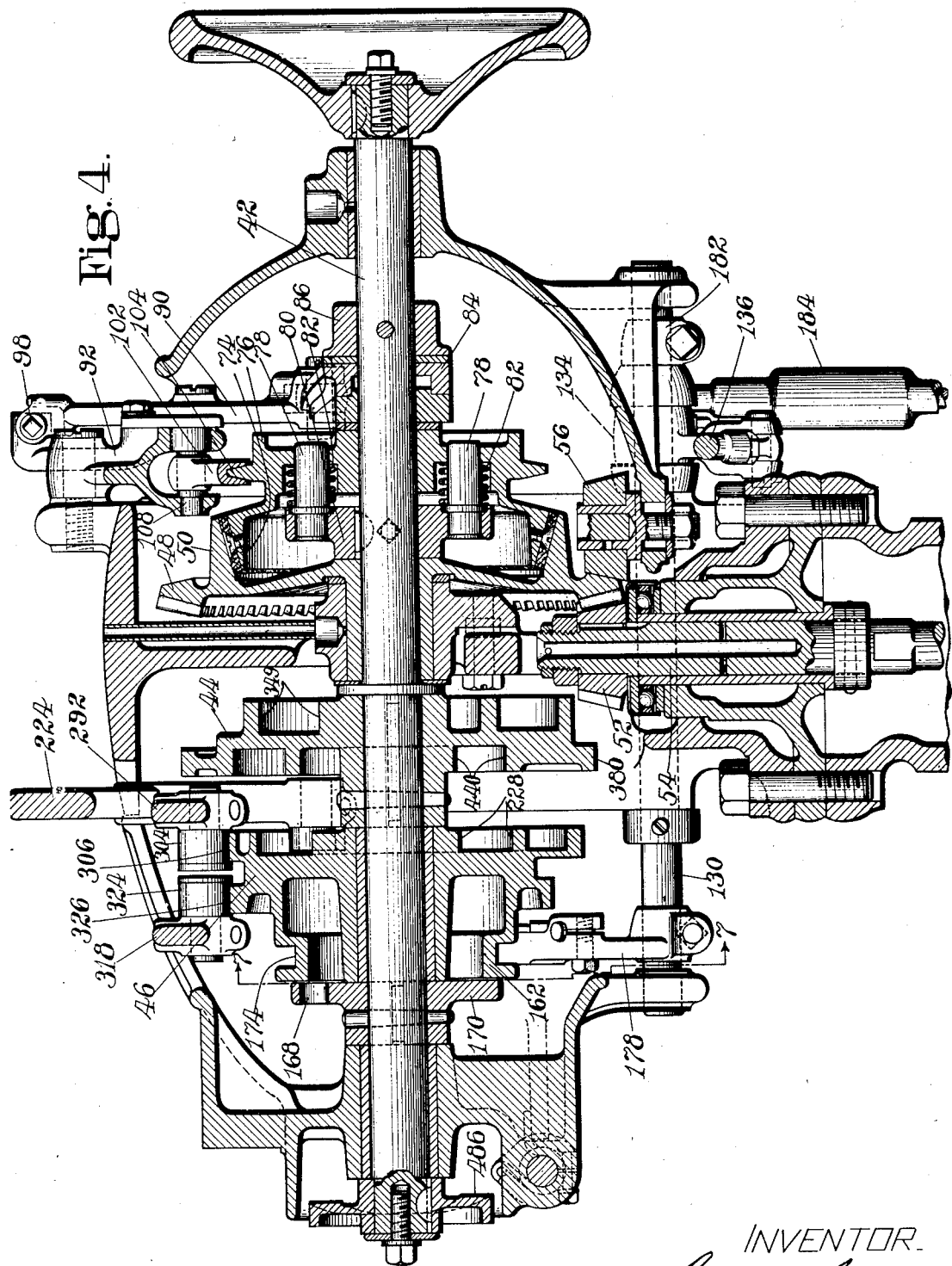
Fig. 4 is a substantially central vertical section through the head of the machine from side to side.

The head 34 supports an operating cam shaft 42 (Fig. 4) which extends laterally of the machine, or from side to side, instead of from front to back as in the machine shown in the prior Letters Patent above mentioned. Mounted to turn about the axis of the cam shaft 42 are two main cam wheels 44 and 46, the cam wheel 44 being provided with cams for operating the staple-forming and driving instrumentalities, and the cam wheel 46 with cams for imparting to the gripper its different movements. The cam wheel 44 is fast on the cam shaft 42, while the cam wheel 46 is so mounted and controlled, as hereinafter more fully described, that it may, at the will of the operator, be held stationary during operative movement of the shaft 42, in order to permit the machine to be used solely as a stapling machine without pulling the upper.

Figure 18:
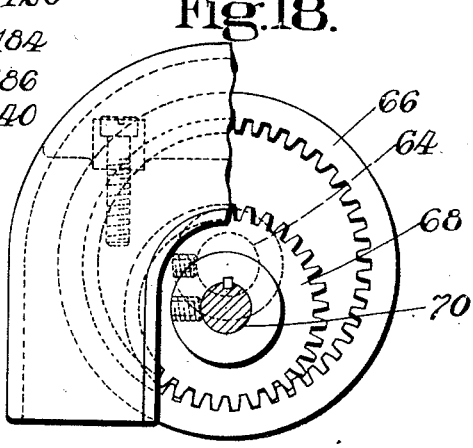
Fig. 18 is a section on the line 18—18 of Fig. 1, showing in elevation a portion of the driving mechanism.

For operating the shaft 42 there is provided a gear wheel 48 which is loosely mounted on the shaft and is provided with a flange 50 so formed as to serve as one member of a cone clutch. The gear wheel 48 is driven by a beveled pinion 52 fast on a vertical shaft 54 which extends downwardly within the column 32, and it is engaged on one side by an idle roll 56 to insure that it will be held at all times in close engagement with the pinion 52, the roll being adjustable lengthwise of the shaft 42 to compensate for wear of the parts. The vertical shaft 54 at its lower end is connected to another vertical shaft 58 (Fig. 1) by means of a rotatable coupling sleeve 60 which is fast on the shaft 58 and is splined to the shaft 54, thus permitting lengthwise movement of the shaft 54 relatively to the shaft 58 in the vertical adjustment of the head 34 while maintaining continuously an operative connection between the two shafts. The shaft 58 is connected by beveled gearing 62 (Fig. 15) to a horizontal shaft 64 on one end of which is secured an internal gear wheel 66 (Fig. 18) engaged by a pinion 68 on a driving shaft 70 which, in the construction shown, is operated by an electric motor 72 mounted on the base 30. It will thus be seen that the shaft 64 is rotated in the same direction as the shaft 70, but at reduced speed by reason of the relation between the size of the pinion 68 and that of gear 66.

Co-operating with the clutch member 50 (Fig. 4) of the continuously running gear wheel 48 is a clutch member 74 formed as a flange on a clutch drum 76 which is mounted for sliding movement lengthwise of the shaft 42. The clutch drum 76 is coupled to the shaft 42 by means of a plurality of pins 78 which are fast in a disk 80 that is keyed to the shaft, the pins extending through holes in the drum 76 to permit the sliding movement of the latter along the shaft. Springs 82 on the pins 78 act, when permitted, to move the clutch drum 76 toward the right (Fig. 4) and thus to disconnect the clutch member 74 from the member 50. For moving the clutch drum 76 in the opposite direction to connect the clutch members and thus to start the operative movement of the cam shaft 42, there is provided a wedge member 84 slidably mounted between the clutch drum and an abutment 86 fast on the shaft 42. The wedge member 84 is pivotally connected at 88 (Fig. 5) to an arm 90 which is carried by a lever 92 curved about the clutch and pivoted at 94 on the head 34. The arm 90 is pivoted at 96 on the lever 92 for purposes of adjustment, and is held in adjusted position by means of opposite set screws 98 arranged to engage a projection 100 on the lever 92.

Carried also by the lever 92 is a brake shoe 102 arranged to engage a flange 104 on the clutch drum 76, the brake shoe being pivotally mounted in a yoke-shaped portion of the lever 92 on an eccentric portion 106 of a shaft 108 along which it slides when the clutch drum is moved lengthwise of the shaft 42. By means of a member 110 fast on the shaft 108 the eccentric 106 may be adjusted to position the brake shoe in proper relation to the flange 104, the member 110 being slotted to receive a clamping screw 112 whereby it is held in adjusted position. Mounted by means of a spring arm 114 on one end of the brake shoe 102 is a lubricating member 116 comprising a piece of felt saturated with oil and in engagement with the flange 104.

Connected to one end of the lever 92 is a spring 118 which acts, when permitted, to swing the lever in the direction to pull the wedge member 84 outwardly and simultaneously to apply the brake shoe 102 to the flange 104 for bringing the cam shaft 42 to a stop. For swinging the lever 92 against the resistance of the spring 118 to release the brake and simultaneously to set the clutch for starting the operation of the shaft 42, there is provided a treadle 120 which is fast on a rock-shaft 122 (Fig. 16) provided with an arm 124 connected by means of a rod 126 to an arm 128 (Figs. 5 and 6) loosely mounted on a rock-shaft 130, the arm 128 being forked at one end to provide a pair of spaced members 132 bearing on the rock-shaft. Between the members 132 there is also mounted loosely on the rock-shaft 130 an arm 134 connected by a link 136 to the lever 92. Mounted in a lug 138 projecting from the arm 134 underneath a portion of the arm 128 is a screw 140 the upper end of which is arranged to be engaged by a portion of the arm 128 to impart operative movement to the arm 134 and the link 136 when the treadle 120 is depressed. The arm 128 and the treadle 120 are held normally in idle position by a spring 142, the idle position of the arm being determined by a screw 144 which is carried by an ear on the arm and is arranged to engage an abutment 146 on the head of the machine. The parts are so arranged that, when the arm 128 is in its idle position, that portion of the arm which engages the screw 140 on the arm 134 is spaced above the upper end of the screw, so as to prevent the arm 128 from limiting, under any conditions of wear, the brake-applying movement of the lever 92.

In order to prevent the shaft 42 from coming to a stop at any point except at the end of the cycle of operations, the lever 92 carries a roll 148 which initially is positioned in a depression 150 in the clutch drum 76 but, when the operative movement of the shaft 42 is started, is engaged by a peripheral face 152 on the clutch drum to prevent the lever 92 from being swung back into position to stop the machine until the depression 150 again arrives in a position opposite the roll 148. The roll 148 is mounted on a holder 154 which is adjustable in the lever 92 by means of a screw 156, a clamp screw 158 being further provided for securing the holder in adjusted position.

Figure 17:
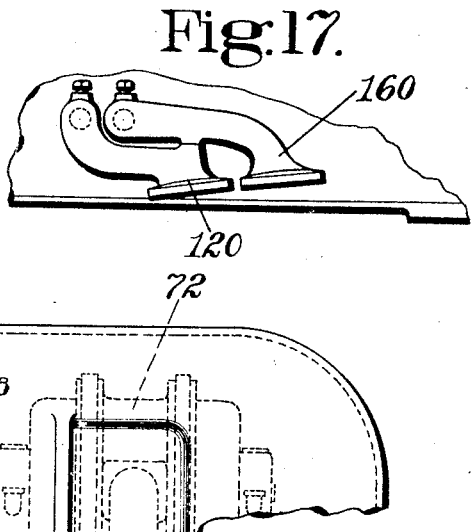
Fig. 17 is a front view of a portion of the base, illustrating the relation of the treadles to each other.

As hereinbefore explained, the cam wheel 46 for operating the gripper does not necessarily turn with the cam shaft 42, so that the machine may, if desired, be used only as a stapling machine without pulling the upper; and the machine will be so used if the treadle 120 alone is depressed. For connecting the cam wheel 46 to the shaft 42 there is provided a separate clutch controlled by another treadle 160 which, as shown in Fig. 17, is arranged to engage and depress also the treadle 120, so that both clutches are actuated substantially simultaneously when it is desired that the machine shall operate both to pull and to fasten the upper. The clutch for connecting the cam wheel 46 to the shaft 42 is herein shown as a pin clutch (Figs. 4, 7 and 8), the cam wheel having a lateral extension 162 in which is slidably mounted a clutch pin 164 arranged to be moved into and out of an opening 168 provided in a disk 170 which is fast on the shaft 142, a spring 166 being provided for moving the pin into the opening upon depression of the treadle 160. The clutch pin 164 is controlled by a treadle-operated wedge member 172 which lies in a groove 174 (Fig. 4) in the extension 162 and is arranged to engage a lug 176 projecting from the clutch pin through a slot in the extension. The wedge member 172 is fast on an arm 178 secured to the rock-shaft 130, and mounted also on the arm 178 is a resilient stop member 180 arranged to be engaged by the lug 176 on the pin 164 to insure against overrunning of the cam wheel 46 when it is disconnected from the disk 170.

The rock-shaft 130 is connected to the treadle 160 by means including an arm 182 (Figs. 5 and 6) which is fast on the rock-shaft and upon which there is pivoted a depending yoke member 184 connected by a rod 186 to an arm 188 (Fig. 16) fast on a rock-shaft 190 on which the treadle 160 is secured. Provision is afforded for limited movement of the rod 186 relatively to the yoke member 184 when the treadle 160 is depressed, the rod being slidably mounted in the yoke member and having fast thereon a block 192 which is arranged to engage a shoulder 194 on the yoke member and thus to impart movement to the latter after a limited amount of movement of the treadle. The amount of lost-motion thus provided for is substantially the same as that between the arm 128 and the screw 140, so that both clutches will be actuated substantially simultaneously. A further reason for the lost-motion between the rod 186 and the yoke member 184 is to relieve the arm 182 of the weight of the treadle 160. For returning the rock-shaft 130 and the wedge member 172 into position to disconnect the cam wheel 46 from the shaft 42 when the treadle 160 is released, there is connected to the arm 182 a spring 196. It will be evident that, by reason of the relation between the treadles 120 and 160, the return of the treadle 160 to its idle position is effected by the same spring 142 which returns the treadle 120.

From the foregoing description it will be understood that, if the machine is to be operated both to pull and to fasten the upper, the treadle 160 is depressed, and that the machine will repeat its cycle for lasting different adjacent portions of the shoe in succession as long as the treadle is held depressed. In case it is desired to perform a single upper-pulling and fastening operation in any location, the operator depresses the treadle and immediately releases it, so that the machine will come to a stop at the end of a single cycle. If the machine is to be used only to fasten the upper, as may be desired, for example, adjacent to the heel and toe ends of the shoe, the operator depresses the treadle 120 alone to cause the machine to drive one or more staples depending upon the length of time that the treadle is held depressed. In the use of the machine in this manner the treadle will usually be so controlled that the machine will come to a stop after driving each staple, thus allowing sufficient time for the operator to present in proper relation to the staple-driving means each portion of the shoe where a staple is to be driven.

For pulling the upper to tension it and to draw it inwardly over the insole, there is provided a gripper (Fig. 9) comprising a pair of jaws 198 and 200, of which the jaw 198 is secured on the lower end of a holder 202 provided with a tubular shank portion 204. The shank 204 is slidably mounted in a sleeve member 206 pivoted on a stud 208 on the front end of an overdraw rod 210 which is slidably mounted in bearings formed in a bracket 212 on the head of the machine. At its upper end the tubular shank 204 is clamped in a holder 214 provided with a stud 216 pivotally mounted in the front end of a lever 218 which is mounted on a rock-shaft 220 on the head of the machine. Pivoted at 222 on the rear end of the lever 218 is another lever 224 provided with a roll 226 engaged by a path cam 228 formed in one side of the cam wheel 46. The levers 218 and 224 are so connected that they move normally as a unit, or as a single updraw lever, about the axis of the shaft 220 in imparting upper-pulling or updraw movement to the gripper, but have relative movement against yielding resistance when the force of the pull on the upper exceeds a predetermined maximum. For this purpose there is pivoted at 230 on the lever 224 a forwardly extending rod 232 slidably mounted in a sleeve member 234 which is adjustably threaded in an upward extension 236 of the lever 218. Between an enlarged head on the sleeve 234 and a flange on the rod 232 there is mounted a fibre thrust washer 238. Coiled about the rod 232 is an updraw spring 240 which bears at one end against a cup-shaped washer 242 slidingly mounted on the sleeve 234 and abutting normally against the front of the extension 236, the spring bearing at its other end against a nut 244 threaded on the rod 232 within convenient reach of the operator as he stands in front of the machine. It will thus be evident that when the force of the pull on the upper exceeds the tension of the spring 240, the spring will yield, permitting the lever 224 to swing about its pivotal connection 222 with the lever 218.

By turning the nut 244 the normal tension of the spring 240 may be varied, in order to vary as desired the force of the pull on the upper, a wing nut 246 being provided for holding the nut 244 in adjusted position. It is sometimes desired to effect a quick adjustment of the tension of the updraw spring, in order to vary the force of the pull in changing from one kind of shoe to another or in operating on different portions of the same shoe. For this purpose the machine is provided with means also within convenient reach of the operator in front of the machine for moving the washer 242 forwardly to increase the tension of the spring, and for holding it in its forward position. This means comprises a lever 248 pivoted at 250 on the lever 218 and having a yoke-shaped upper end (Fig. 3) provided with pins 252 which bear on an outturned flange formed on the washer 242. The lower end of the lever 248 is connected by a link 254 to a crank pin 256 fast on a rock-shaft 258 carried by the lever 218. The rock-shaft 258 is turned by means of a lever or arm 260 which is fast thereon, and for limiting its turning movement the rock-shaft carries a finger 262 arranged to engage a pin 264 on the lever 218, the arrangement being such that when the finger 262 is in engagement with the pin 264 the crank pin 256 is on dead center, or slightly beyond dead center, so that the parts of the tension-adjusting mechanism are automatically retained in adjusted position. The manner in which this mechanism is utilized to effect a quick adjustment of the tension of the updraw spring will be further evident from a comparision of the full and dotted line positions of the parts as indicated on Fig. 9.

The gripper jaw 200 is supported on the holder 202 by a link 266 and at its upper end is connected by a link 268 to a closing rod 270 slidingly mounted in the tubular shank 204. It will be understood that closing movement of the jaw 200 toward the jaw 198 is effected by downward movement of the rod 270, the movement of the jaw being further controlled by a cam member 272 on the holder 202 in substantially the same manner as disclosed in the prior Letters Patent, the upper end of the jaw 200 having a nose portion 273 arranged to bear on the cam member and pressed toward said member by means of a spring plunger 274 which is mounted in the jaw 200 and bears on a lug 276 projecting from the link 268. The cam member 272 is adjustable by means of a wedge 278 controlled by a screw 280, and is held in adjusted position by a nut 282 threaded on a rod 284 which projects from the cam member.

At its upper end the jaw-closing rod 270 is engaged by a rocker 286 which is operated by a thrust rod 288 slidingly mounted in a boss 290 on the lever 218 and in an opening in the rock-shaft 220 which supports and turns with the lever. Operative movement is imparted to the rod 288 by a lever 292 pivoted at 294 on the head of the machine, this lever having mounted in an upward extension thereof a plunger 296 which abuts against the rear end of the rod 288. Adjustably threaded in the upward extension of the lever 292 is a sleeve member 298 which provides a bearing for one end of the plunger 296 and serves as an abutment for one end of a spring 300 which bears at its other end upon a flange 302 formed on the plunger. The spring 300 is thus arranged to yield at the end of the closing movement of the jaw 200 and thereafter to hold the jaw in effective gripping engagement with the upper. Since the rod 288 intersects the axis of the updraw lever 218, and since its rear end which is engaged by the plunger 296 is close to said axis, the plunger 296 opposes no substantial resistance to the updraw movement of the lever. The lever 292 is provided with a roll 304 engaged by a peripheral cam 306 on the cam wheel 46 for imparting jaw-closing movement to the rod 270. Return upward movement of the rod is effected by a spring 308 on the gripper, one end of which bears on a washer 310 on the upper end of the sleeve member 206 and the other end of which bears on a washer 312 slidingly mounted on the shank 204, the washer 312 engaging a pin 314 carried by the rod 270 and extending through the rod and through slots in the shank 204. To limit the upward movement of the rod 270 there is clamped on the shank 204 a collar 316 in position to be engaged by the pin 314.

For operating the overdraw rod 210 there is provided a lever 318 which is pivotally mounted on a rod 320 fast on the head of the machine and is forked at one end for sliding engagement with a block 322 pivoted on the rod 210. At its other end the lever 318 is provided with a roll 324 engaged by a peripheral cam 326 on the cam wheel 46. The movement of the rod 210 in the direction to pull the upper inwardly over the insole is effected by a torsion spring 328 (Fig. 3) one end of which engages a lug on the lever 318 while the other end engages one or another of a series of teeth 330 formed on an adjusting member 332 which is mounted for turning movement about the rod 320 and is turned by means of a handle 334. The member 332 is held in adjusted position by means of a spring-controlled detent 336 in engagement with a ratchet wheel 338 which is fast on the rod 320. It will be understood that the spring 328 holds the roll 324 in engagement with the cam 326, and that the cam acts positively on the lever 318 against the tension of the spring to move the gripper outwardly toward the edge of the insole into position to grip the margin of the upper.

The movements of the gripper in the cycle of operations of the machine are illustrated in Figs. 19 to 22, inclusive. The shoe is positioned and guided by an anvil member or work rest 340, more particularly hereinafter described, which engages the inner face of the insole rib, and the movement of the gripper into position to grip the margin of the upper material is substantially in a path represented by the broken line a in Fig. 19. It will be seen that the gripper is first moved downwardly toward the insole at the inner side of the rib in a direction substantially perpendicular to the bottom face of the insole, by the action of the cam 228 on the lever 224, until the lower gripper jaw 198 is in a position in which it may, as shown, be closer to the bottom face or the plane of the insole than the top of the rib. The overdraw cam 326 then acts on the lever 318 to swing the gripper outwardly toward the edge of the insole about its pivotal connection 216 with the updraw lever 218; and by reason of the inclination of the shank 204 of the gripper, as illustrated in Fig. 9, this swinging movement serves to carry the gripper jaws upwardly from the insole so that the lower jaw clears the top of the insole rib. After the gripper jaws have been swung outwardly beyond the insole rib, the gripper is moved farther downwardly toward the plane of the insole by the cam 228 and is also moved farther outwardly toward the edge of the insole by the cam 326 before the jaws are closed to grip the upper materials. It will be understood that this path of movement of the gripper is such as to insure that the jaws will properly receive between them the different layers of the upper materials, including the lining, in any position that the lining may assume relatively to the rib of the insole.

At the end of the downward and outward movements of the gripper, the jaws are closed upon the upper by the cam 306, and thereafter the gripper receives its updraw movement to pull the upper. In this updraw movement the overdraw cam 326 acts to impart to the gripper a further outward movement relatively to the side of the last, as illustrated in Fig. 20, so that the gripper pulls the upper somewhat away from the edge of the insole and the side of the last, to lessen the friction between the upper and the last and to insure against bending the feather of the insole upwardly from the bottom of the last. At the end of the updraw movement the overdraw cam 326 permits the spring 328 to act to impart overdraw movement to the gripper in time relation to the operation of the overlaying and fastening mechanism, hereinafter described. It will be evident that this overdraw movement is a swinging movement about the pivotal connection 216, so that the gripper jaws have a component of movement downwardly toward the insole as well as inwardly from the edge of the insole, thus facilitating the overlaying of the upper. The action of the gripper, in relation to the overlaying and fastening means, will be hereinafter further referred to in the description of the operation of the machine as a whole.

The overlaying and fastening mechanism, including means for forming staples above the line of drive and for transferring them into alignment with the staple driver, is in many respects similar to the construction shown and described in the prior Letters Patent. Secured on the head of the machine by clamping screws 342 (Fig. 2), and adjustable along a guideway on the head by means of a screw 344, is a bracket 346 which is so formed as to provide a forwardly and downwardly inclined guideway for a movable slide 348 (Fig. 10), this slide having mounted thereon the overlaying means and also the staple transferring and driving mechanisms and a portion of the staple forming mechanism. For moving the slide 348 along its guideway, there is formed in one side of the cam wheel 44 a path cam 349 (Fig. 2) which engages a roll 350 on the slide.

Secured to the bracket 346 is a plate 351 (Fig. 11) which has depending therefrom a finger 352 shaped and arranged to serve as an inside former for the staple. Mounted also on the bracket 346, in fixed relation to the inside former 352, is a wire-guiding nozzle 354 to which wire for forming the staples is fed by means hereinafter described, the wire being advanced until its end engages the head of a stop screw 356 in the bracket 346. The wire is thus fed forwardly over the upper surface of a block 358 which is mounted on the front end of the movable slide 348 and serves, as hereinafter described, as a member for laying the upper inwardly over the insole and as a nozzle for guiding the staple as it is driven. Secured to the block 358 are two guide members 360 portions of which are spaced from the upper face of the block to provide a guideway for the wire. The relation between the wire and these different parts will be more fully understood by reference to Fig. 13.

Co-operating with the inside former 352 is an outside former comprising two plates 362 which are spaced apart and are provided with shoulders under which the staple is formed and which serve thereafter as means for forcing the staple downwardly to transfer it into line with the driver (Figs. 12 and 13). The plates 362 are fast on a bar 364 which is mounted in a guideway on the slide 348 for movement in directions at right angles to the directions of movement of the slide. It will be understood that the forming of the staple is effected by the forward movement of the slide 348, the wire being first severed by a cutter 366 which is carried by the slide and co-operates with the wire-guiding nozzle 354 to cut the wire before the forming of the staple begins. Carried also by the slide 348 is a plate 368 from the lower end of which extends a finger 370 for pressing the cross-bar of the staple against the inside former 352 at the end of the forward movement of the slide to insure that the cross-bar will be straight. The slide 348 is further provided with a member or plate 372 which, at the end of the forward movement of the slide, arrives in position for one of its edges to align with the inside former 352 so as to serve as a guide for the staple as the latter is moved downwardly into alignment with the driver.

For imparting staple-transferring movement to the bar 364 which carries the outside former 362 there is provided a bell-crank lever 374 (Fig. 2), one arm of which is adjustably connected by a link 376 to the bar 364, and the other arm of which is provided with a roll 378 engaged by a peripheral cam 380 on the cam wheel 44. A spring 382 coiled about the axis of the lever 374 acts on the lever to impart staple-transferring movement to the bar 364, and the cam acts positively to return the bar and the outside former into staple-forming position. For limiting the transferring movement of the bar 364 the slide 348 carries a stop screw 384 (Fig. 10) which is engaged by a lug 386 on the bar, the screw 384 being adjustable to cause the staple at the end of its transferring movement to align properly with the driver.

The driver 388 is carried by a slide 390 mounted in a guideway formed in a member 392 fast on the slide 348. The end of the driver advances along a ledge 394 (Fig. 14) which receives and supports the staple at the end of the transferring movement, and in alignment with the upper surface of this ledge is a staple-guiding slot 396 formed in a cap 398 which is secured to the block 358. For operating the driver slide 390 there is provided an arm 400 which at its upper end is pivoted on a stud 402 on the slide 348 and at its lower end has a bearing in a recess formed in the slide 390. The arm 400 is operated to impart staple-driving movement to the driver 388 by a torsion spring 404 (Fig. 12), one end of which is connected to a member 406 which may be turned to adjust the tension of the spring and is held in adjusted position by a pin 408 arranged to enter any one of a series of holes 410 formed in a member 412 fast on the stud 402. To limit the driving movement of the lever 400 there is provided a fibre washer 414 which is adjustable by means of a screw 416 mounted in a split bracket 418 on the slide 348, a screw 420 being provided for effecting relative movement of the two parts of the split bracket to bind the screw 416 in adjusted position.

For swinging the arm 400 against the resistance of its spring 404 to retract the driver preparatory to the staple-driving operation, there is pivoted at 422 on the head of the machine (Figs. 2 and 10) a lever 424 on which is pivotally mounted at 426 a latch 428 for engaging the lower end of a plate 430 on the arm 400. A spring 432 connected at one end to the latch 428 and at its other end to a pin 434 on the lever 424 tends to hold the latch in position to engage the plate 430. It will thus be evident that when the slide 348 receives its forward movement, the arm 400 is held back by the latch 428, so that the driver 388 does not move forwardly with the slide. For operating the latch 428 to release the arm 400 for the staple-driving operation, the slide 348 carries an adjustable screw 436 the head of which is arranged to engage and operate a finger 438 projecting from the latch. The forward movement of the slide 348, however, does not carry the screw 436 far enough to act on the finger 438, since it is necessary to allow time for the transferring of the staple after the slide has arrived at the end of its forward movement. Release of the arm 400 is accordingly effected in response to a movement of the lever 424 such as to cause the screw 436 to act on the finger 438 to disconnect the latch 428 from the plate 430, this movement of the lever being effected by a path cam 440 formed in one side of the cam wheel 44 and engaging a roll 442 on the lever 424. In the return of the parts to starting position the latch 428 is engaged by a stop shoulder 444 on the lever 424 to hold it in position to connect again with the plate 430 when the slide 348 arrives at the end of its retractive movement.

It is desirable that in the driving of the staple its legs be guided in straight paths as they begin to enter the work, so that they will be directed properly in relation to the clinching means without distortion due to resistance of the work. For this purpose there is pivotally mounted in the nozzle member 358 a guide member 445 having a portion corresponding in width to the distance between the legs of the staple and lying in the slot 396 formed in the cap member 398, the guide member being held downwardly by means of a spring plunger 446. It will be understood that the guide member 445 is housed within the staple nozzle where its action is not interfered with by pressure of the upper thereon, and that after performing its function of guiding the legs of the staple the member is lifted by engagement of the driver 388 therewith.

When the staple is driven through the upper and the rib of the insole its legs are clinched by engaging depressions 447 (Fig.

14) formed in the end of the anvil member 340, the arrangement shown being such that the legs are turned outwardly away from each other in the clinching operation. By reference to Fig. 3 it will be seen that the lower end of the member 340 is offset laterally, so that the staple is driven through a portion of the upper which is directly in the line of the pulling strain applied by the gripper. The anvil member 340 is adjustably secured in a holder 448 on which is a stud 450 (Fig. 11) mounted to turn in a sleeve 452 which is adjustably clamped by means of a screw 454 in a split bearing formed in the front end of the bracket 346. A cap 455 secured on the end of the stud 450 and overlapping the end of the sleeve 452 holds the stud and the sleeve against relative lengthwise movement. The sleeve 452 is provided with an arm 456 in which is mounted a spring 458 which bears on the holder 448 and thus tends to swing the member 340 toward the staple-driving means. In another arm fast on the sleeve 452 is mounted a stop screw 460 arranged to be engaged by a finger 462 on the holder 448 to determine the position of the anvil member 340 with respect to movement toward or from the staple-driving nozzle 358. By adjusting the screw 460 the anvil 340 may thus be positioned relatively to the nozzle member 358 in accordance with the thickness of the shoe materials which are to be clamped between this member and the anvil. The spring 458 moreover affords provision for yield of the anvil in accordance with variations in the thickness of the materials at different parts of the shoe, but is of sufficient strength to hold the anvil firmly in position to clinch the legs of the staple. The tension of the spring 458 may be adjusted by means of a screw 464. The anvil member is adjusted into proper position laterally of the staple-driving nozzle by sliding the sleeve 452 lengthwise in its bearing in the bracket 346, a key 466 being provided for holding the sleeve from turning.

The means for feeding the wire to form the staples is similar in construction to that shown and described in the prior Letters Patent, and need not be described herein in detail. Briefly stated, there is a reel 468 (Fig. 3) for the wire, mounted to turn on a pin 470, and from the reel the wire is led up over an idler pulley 472 and thence downwardly between feed rolls 474 and 476. From the feed rolls the wire is led through a tube 478 to the wire-guiding nozzle 354. The feed roll 474 is operated by a pawl and ratchet mechanism through a link 480 and a bell-crank lever 482 provided with a roll 484 engaged by a cam wheel 486 on the camshaft 42. In order to stop the feed of the wire, if desired, there is provided a finger 488 which may be turned by a handle 490 into position to engage a face 492 on the lever 482 and thus swing the lever into such a position as to prevent it from being operated by the cam wheel 486.

In the use of the machine the operator presents a shoe with the rib of the insole in engagement with the work rest or anvil member 340, starting usually at the forepart of the shoe adjacent to the previously pulled-over toe portion of the upper, and then depresses the main starting treadle 160 and holds it depressed while moving the shoe lengthwise and turning it relatively to the member 340 as the contour of the side of the shoe varies along the ball and the shank, thus lasting the shoe progressively from the toe end to the heel end. In each cycle of operations the gripper is moved first substantially in the path indicated by the line $a$ (Fig. 19) into position to grip the margin of the upper materials, as hereinbefore explained, and then receives its updraw movement combined with a further outward movement relatively to the side of the shoe, thus pulling the upper somewhat away from the side of the last and the edge of the insole, as illustrated in Fig. 20. The gripper then receives its overdrawing movement, swinging about an axis so located that the gripper jaws approach the plane of the insole while moving inwardly over the bottom of the insole, without any relaxing of the tension of the updraw spring. During the overdrawing movement of the gripper the overlaying member 358 is moved toward the shoe in a path inclined to the plane of the insole, engaging the tensioned upper first at a substantial distance above the edge of the insole and then laying or tucking the upper into the angle between the feather and the rib of the insole while the upper is still held by the gripper. At the end of the inward movement of the member 358 the margin of the upper and the insole rib are clamped between this member and the anvil member 340, which may yield to prevent excessive clamping pressure at any part of the shoe where an unusual thickness of upper materials is encountered. After the upper has been thus clamped against the rib of the insole, or approximately at the time when the clamping takes place, the gripper will preferably release its hold on the margin before the upper is fastened to the rib, since the clamping pressure is sufficient to prevent any loss of tension.

In the forward movement of the overlaying member 358 a staple is formed in the manner hereinbefore explained, and after the member has arrived at the end of its movement the staple is transferred into alignment with the driver and is then driven through the upper and the insole rib and clinched by the member 340 while the upper and the rib are still clamped between this member and the overlaying member. Thereafter the parts are returned to their starting positions preparatory to the beginning of the next cycle.

When it is desired to drive a staple without pulling the upper, for example, at the rear end of the insole rib adjacent to the heel seat, the operator presents that part of the rib where the staple is to be driven against the anvil 340, and then depresses the treadle 120 to render the staple-forming and driving mechanism operative while the gripper is idle, releasing the treadle immediately, so that the machine will come to a stop at the end of a single cycle.

While the invention is herein shown as embodied in a machine designed especially for welt work, it will be recognized that many of its features are not limtied to that type of work, but are applicable to machines for operating on shoes of other types, and it is further to be understood that, except where the context requires a more limited interpretation, the term "insole" used in the appended claims is intended to comprehend not only the insole of a welt or other type of shoe, but generally that part to which the upper is fastened in lasting, which in some types of shoes may be the outsole or the only sole with which the shoe is provided.

Novel features of the means herein disclosed for controlling the staple driver are claimed in a divisional application, Serial No. 402,495, filed on October 25, 1929.

Having described the invention, what I claim as new and desire to secure by Letters Patent of the United States is:—

1. In a machine of the class described, the combination with means for positioning a last and shoe materials thereon including an upper and an insole, of a gripper for pulling the upper over the last, and operating means for said gripper constructed to impart thereto while its jaws are open, preparatory to the gripping of the margin of the upper materials, first a movement toward the bottom face of the insole and then a movement outwardly toward the edge of the insole.

2. In a machine of the class described, the combination with means for positioning a last and shoe materials thereon including an upper and an insole, of a gripper for pulling the upper over the last, and gripper-operating means comprising cams formed to impart to the gripper, preparatory to the gripping of the margin of the upper materials, first a movement toward the bottom face of the insole in a direction substantially perpendicular to the plane of the insole and then a movement outwardly toward the edge of the insole into upper-gripping position.

3. In a machine of the class described, the combination with means for positioning a last and shoe materials thereon including an upper and an insole provided with a rib on its bottom face, of a gripper for pulling the upper, and operating means for said gripper constructed to impart thereto, preparatory to the gripping of the margin of the upper materials, a movement toward the plane of the insole inside of the rib and then a movement outwardly toward the edge of the insole combined with a movement away from said plane to clear the rib.

4. In a machine of the class described, the combination with means for positioning a last and shoe materials thereon including an upper and an insole provided with a rib on its bottom face, of a gripper for pulling the upper, and means for imparting to said gripper, preparatory to the gripping of the margin of the upper materials, a movement toward the insole inside of the rib into a position closer to the plane of the insole than the top of the rib and then a movement outwardly toward the edge of the insole in such a path as to clear the rib.

5. In a machine of the class described, the combination with means for positioning a last and shoe materials thereon including an upper and an insole provided with a rib on its bottom face, of a gripper for pulling the upper, and operating means for said gripper constructed to impart thereto, preparatory to the gripping of the margin of the upper materials, a movement toward the plane of the insole inside of the rib and then a swinging movement outwardly toward the edge of the insole about an axis so located as to carry the gripper jaws away from said plane to clear the rib.

6. In a machine of the class described, the combination with means for positioning a last and shoe materials thereon including an upper and an insole provided with a rib on its bottom face, of a gripper for pulling the upper, and means for imparting to said gripper, preparatory to the gripping of the margin of the upper materials, a movement toward the insole inside of the rib into a position closer to the plane of the insole than the top of the rib and then a movement outwardly toward the edge of the insole in such a path as to clear the rib and to approach the plane of the insole again outside of the rib.

7. In a machine of the class described, the combination with means for positioning a last and shoe materials thereon including an upper and an insole provided with a rib on its bottom face, of a gripper for pulling the upper, and operating means for said gripper constructed to impart thereto, preparatory to the gripping of the margin of the upper materials, a movement toward the plane of the insole inside of the rib and then a movement outwardly toward the edge of the insole combined with a movement first away from said plane to clear the rib and then toward said plane outside of the rib.

8. In a machine of the class described, the combination with means for positioning a last and shoe materials thereon including an upper and an insole provided with a rib on its bottom face, of a gripper for pulling the upper, and operating means for said gripper constructed to impart thereto, preparatory to the gripping of the margin of the upper materials, a movement toward the plane of the insole inside of the rib and then a swinging movement outwardly toward the edge of the insole about an axis so located as to carry the gripper away from said plane to clear the rib, together with a further movement toward said plane outside of the rib.

9. In a machine of the class described, the combination with a gripper for pulling an upper over a last successively in different locations along the edge of the last bottom, and means for effecting relative movement of said gripper and the last heightwise of the last to pull the upper in each of said locations, of mechanism operative independently of said relative movement to impart to the gripper movement to pull the upper outwardly from the side of the last.

10. In a machine of the class described, the combination with a gripper for pulling an upper over a last, and means for imparting to said gripper updraw movement heightwise of the last, of mechanism operative independently of the updraw means to impart to the gripper in automatically determined time relation to its updraw movement a movement to pull the upper outwardly from the side of the last.

11. In a machine of the class described, the combination with a gripper for pulling an upper over a last, and means for imparting to said gripper updraw movement heightwise of the last, of a rotatable cam for imparting to the gripper in its updraw movement a movement to pull the upper outwardly from the side of the last.

12. In a machine of the class described, the combination with a gripper movable to grip and pull an upper at the side of a last both heightwise of the last and inwardly over the bottom of the last, of an updraw cam and an overdraw cam for imparting to the gripper respectively movement heightwise of the last and movement laterally of the last, said overdraw cam being so formed as to cause the gripper while gripping the upper to move in a direction to pull the upper outwardly from the side of the last prior to its movement to pull the upper inwardly over the bottom of the last.

13. In a machine of the class described, the combination with means for positioning a last with shoe materials including an upper and an insole thereon, of a gripper for pulling the upper, means for imparting to said gripper updraw movement heightwise of the last, and means for moving the gripper outwardly toward the edge of the insole into position to grip the upper and for thereafter moving it farther outwardly, in automatically determined time relation to its first outward movement and to its updraw movement, to pull the upper away from the side of the last and the edge of the insole.

14. In a machine of the class described, the combination with a gripper for pulling an upper over a last, of means for imparting to said gripper overdrawing movement inwardly over the bottom of the last about an axis so arranged as to cause the gripper jaws to have a substantial component of movement toward the bottom of the last as they draw the margin of the upper inwardly.

15. In a machine of the class described, the combination with a gripper for pulling an upper over a last, of an updraw lever to which the gripper is pivotally connected, and means for swinging the gripper about its pivotal connection to the updraw lever to draw the margin of the upper inwardly over the bottom of the last, said pivotal connection being so arranged as to cause the gripper jaws to have a substantial component of movement toward the bottom of the last as they draw the margin of the upper inwardly.

16. In a machine of the class described, the combination with a gripper for pulling an upper over a last and over an insole on the bottom of the last, of means for swinging said gripper inwardly over the bottom of the last about an axis so arranged as to cause the gripper jaws to approach the bottom face of the insole in their swinging movement, and a member movable in a direction inclined toward the bottom of the last to lay the upper over the insole as it is pulled inwardly by the gripper.

17. In a machine of the class described, the combination with a gripper for pulling an upper over a last and over an insole on the bottom of the last, of means including an updraw spring for operating said gripper to pull the upper heightwise of the last, means for imparting to said gripper overdrawing movement inwardly over the bottom of the last without relaxing the tension of the updraw spring, and a member movable in a direction inclined at a substantial angle to the bottom of the last to engage the margin of the upper initially at a distance from the edge of the insole and to lay it over the insole by pressure substantially localized at a distance from the edge of the insole as it is pulled inwardly by the gripper.

18. In a machine of the class described, the combination with a gripper for pulling an upper over a last and over an insole on the bottom of the last, of means including an updraw spring for operating said gripper to pull the upper heightwise of the last, means for imparting to said gripper overdrawing movement, without relaxing the tension of the updraw spring, about an axis so arranged as to cause the gripper jaws to approach the bottom of the last while pulling the margin of the upper inwardly, and a member movable in a direction inclined toward the bottom of the last to engage the margin of the upper initially at a substantial distance from the edge of the insole and to lay it over the insole as it is pulled inwardly by the gripper.

19. In a machine of the class described, the combination with a gripper for pulling an upper over a last, of a two-part updraw lever for operating said gripper, one part of said lever being fulcrumed on the head of the machine and having the gripper connected thereto at one side of its fulcrum and the other part of the lever pivoted thereon at the opposite side of the fulcrum, operating means engaging said last-named part of the lever, and a connection between the two parts arranged to yield in response to resistance of the upper to the pull of the gripper.

20. In a machine of the class described, the combination with a gripper for pulling an upper over a last, of a two-part updraw lever for operating said gripper, one part of said lever being movable about a fixed axis located between its ends and having the gripper connected thereto at one end and the other part of the lever pivoted thereon at the other end, a cam for operating said last-named part of the lever, and a spring connection between the two parts arranged to yield in response to resistance of the upper to the pull of the gripper.

21. In a machine of the class described, the combination with a gripper for pulling an upper over a last, of a two-part updraw lever for operating said gripper comprising a front part and a rear part one of which is pivotally mounted on the other, and a substantially horizontal coil spring affording a yielding connection between the two parts of the lever.

22. In a machine of the class described, the combination with a gripper for pulling an upper over a last, of a two-part updraw lever for operating said gripper, one part of said lever being movable relatively to the other in response to resistance of the upper to the pull of the gripper, a spring affording a connection between the two parts of the lever, said spring extending forwardly toward the operator's working position, and means at the front end of said spring for adjusting its tension.

23. In a machine of the class described, the combination with a gripper for pulling an upper over a last, of a two-part updraw lever for operating said gripper, one part of said lever being fulcrumed on the head of the machine and having the gripper connected thereto at one side of its fulcrum and the other part of the lever pivoted thereon at the opposite side of the fulcrum, means for operating said last-named part of the lever, and a further connection between the two parts of the lever comprising a substantially horizontal coil spring arranged to yield in response to resistance of the upper to the pull of the gripper.

24. In a machine of the class described, the combination with a gripper for pulling an upper over a last, of a two-part updraw lever for operating said gripper comprising a front part connected to the gripper and a rear part pivotally mounted on the front part, means for operating said rear part, and a yielding connection between the two parts of said lever comprising a rod pivoted on the rear part and extending forwardly through a portion of the front part and a coil spring on said rod.

25. In a machine of the class described, the combination with a gripper for pulling an upper over a last, of a two-part updraw lever for operating said gripper comprising a front part and a rear part one of which is pivotally mounted on the other, the two parts of the lever having upward extensions, a rod pivoted on one of said extensions and projecting substantially horizontally through the other extension, and a coil spring on said rod affording a yielding connection between the two parts of the lever.

26. In a machine of the class described, the combination with a gripper for pulling an upper over a last, of a two-part updraw lever for operating said gripper comprising a front part and a rear part one of which is pivotally mounted on the other, said parts having upward extensions thereon, a rod projecting from one of said extensions forwardly through the other extension and having a spring thereon affording a yielding connection between the two parts, and a device within convenient reach of the operator in his working position for adjusting the tension of said spring.

27. In a machine of the class described, the combination with a gripper for pulling an upper over a last, of an updraw lever for operating said gripper, a spring extending generally lengthwise of said lever and yieldable in response to resistance of the upper to the pull of the gripper, and mechanism including a member mounted for turning movement on the front end portion of the updraw lever to adjust the tension of said spring.

28. In a machine of the class described, the combination with a gripper for pulling an upper over a last, of an updraw lever for operating said gripper, a spring yieldable in response to resistance of the upper to the pull of the gripper, and mechanism comprising a hand lever mounted on the updraw lever within convenient reach of the operator in his working position for adjusting the tension of said spring.

29. In a machine of the class described, the combination with a gripper for pulling an upper over a last, of an updraw lever for operating said gripper, a spring yieldable in response to resistance of the upper to the pull of the gripper, and mechanism for adjusting the tension of said spring comprising a hand lever carried by the updraw lever and a second lever also mounted on the updraw lever and connected to said hand lever, said second lever being arranged to compress the spring in response to movement of the hand lever.

30. In a machine of the class described, the combination with a gripper for pulling an upper over a last, of a two-part updraw lever for operating said gripper, one part of said lever being movable relatively to the other in response to resistance of the upper to the pull of the gripper, a spring extending generally lengthwise of said lever and affording a yielding connection between the two parts of the lever, and means on the front end of said lever for adjusting the tension of said spring.

31. In a machine of the class described, the combination with a gripper for pulling an upper over a last, of a two-part updraw lever for operating said gripper comprising a front part connected to the gripper and a rear part pivotally mounted on the front part, a yielding connection between the two parts of the lever comprising a forwardly extending coil spring, and mechanism mounted on the front part of the lever for adjusting the tension of said spring.

32. A machine for lasting different portions of a shoe successively having, in combination, a shoe rest arranged to engage a shoe in the hands of the operator in different successive lasting positions, a gripper for pulling the upper in each lasting position, a two-part updraw lever to one part of which the gripper is connected, means for positively operating the other part of said lever, and a connection between the two parts of the lever comprising a forwardly extending coil spring yieldable in response to resistance of the upper to the pull of the gripper.

33. A machine for lasting different portions of a shoe successively having, in combination, a shoe rest arranged to engage a shoe in the hands of the operator in different successive lasting positions, a gripper for pulling the upper in each lasting position, a two-part updraw lever for operating said gripper, one part of said lever being fulcrumed on the head of the machine and having the gripper connected thereto at one side of its fulcrum and the other part of the lever pivoted thereon at the opposite side of the fulcrum, means for operating said last-named part of the lever, and a connection between the two parts arranged to yield in response to resistance of the upper to the pull of the gripper.

34. A machine for lasting different portions of a shoe successively having, in combination, a shoe rest arranged to engage a shoe in the hands of the operator in different successive lasting positions, a gripper for pulling the upper in each lasting position, a cam shaft extending laterally of the machine, a two-part updraw lever for operating said gripper, said lever extending forwardly in a plane substantially perpendicular to the cam shaft, a cam on said shaft for operating the rear part of the lever, and a spring connection between the two parts of the lever arranged to yield in response to resistance of the upper to the pull of the gripper.

35. A machine for lasting different portions of a shoe successively having, in combination, a shoe rest arranged to engage a shoe in the hands of the operator in different successive lasting positions, a gripper for pulling the upper in each lasting position, a cam shaft extending laterally of the machine, a two-part updraw lever for operating said gripper, said lever extending forwardly in a plane substantially perpendicular to said cam shaft and comprising a front part fulcrumed on the head of the machine and connected to the gripper and a rear part pivoted on the rear end portion of said front part, a cam on the cam shaft for positively operating said rear part, and a yieldable connection between the parts of the lever comprising a forwardly extending coil spring yieldable in response to resistance of the upper to the pull of the gripper.

36. In a machine of the class described, the combination with a gripper for pulling an upper over a last, and an updraw lever for operating said gripper to pull the upper, of mechanism including a longitudinally movable push rod extending lengthwise of said updraw lever for effecting relative closing movement of the gripper jaws.

37. In a machine of the class described, the combination with a gripper for pulling an upper over a last, comprising a pair of jaws and a closing rod for effecting relative closing movement of said jaws, and an updraw lever for operating said gripper to pull the upper, of a push rod extending lengthwise of said updraw lever and movable longitudinally to impart jaw-closing movement to said closing rod, and a rocker mounted on said updraw lever at the front end of said push rod for transmitting the movement of the push rod to the jaw-closing rod.

38. In a machine of the class described, the combination with a gripper for pulling an upper over a last comprising a pair of jaws and a closing rod for effecting relative closing movement of said jaws, and an updraw lever for operating said gripper to pull the upper, of mechanism including a longitudinally movable push rod extending lengthwise of said updraw lever for imparting jaw-closing movement to said closing rod, and yieldable means for operating said push rod.

39. In a machine of the class described, the combination with a gripper for pulling an upper over a last, comprising a pair of jaws and a closing rod for effecting relative closing movement of said jaws, and an updraw lever for operating said gripper to pull the upper, of mechanism including a longitudinally movable push rod extending lengthwise of said updraw lever for imparting jaw-closing movement to said closing rod, and a lever movable about an axis extending transversely of said updraw lever for operating said push rod.

40. In a machine of the class described, the combination with a gripper for pulling an upper over a last, comprising a pair of jaws and a closing rod for effecting relative closing movement of said jaws, and an updraw lever for operating said gripper to pull the upper, of mechanism including a longitudinally movable push rod extending lengthwise of said updraw lever for imparting jaw-closing movement to said closing rod, a cam-operated lever for imparting lengthwise movement to said push rod, and a spring plunger carried by said last-named lever for engaging the rear end of the push rod.

41. In a machine of the class described, the combintion with a gripper for pulling an upper over a last, of a cam shaft extending laterally of the machine, an updraw lever extending forwardly for operating said gripper to pull the upper, a cam on said shaft for operating said updraw lever, mechanism including a longitudinally movable push rod extending forwardly along said updraw lever for effecting relative closing movement of the gripper jaws, a lever for operating said push rod, and a cam on said cam shaft for operating said last-named lever.

42. In a machine of the class described, the combination with a gripper for pulling an upper over a last, and an updraw lever for operating said gripper to pull the upper, of mechanism for effecting relative closing movement of the gripper jaws comprising a push rod mounted to swing with said lever and movable lengthwise to close the jaws, said push rod extending through the axis of the updraw lever.

43. In a machine of the class described, the combination with a gripper for pulling an upper over a last, and an updraw lever for operating said gripper to pull the upper, of mechanism for effecting relative closing movement of the gripper jaws comprising a push rod mounted to swing with said lever and extending through the axis of the lever, and means for engaging the push rod close to said axis to move the rod lengthwise for closing the jaws and for holding them closed during the updraw movement of the gripper.

44. In a machine of the class described, the combination with a gripper and means for operating it to pull an upper over a last, of an overdraw rod movable lengthwise in opposite directions to swing said gripper outwardly and inwardly over the bottom of the last, a lever connected to said overdraw rod for moving said rod in the opposite directions, and a spring arranged to act on said lever to move the rod in one of said directions.

45. In a machine of the class described, the combination with a gripper and means for operating it to pull an upper over a last, of an overdraw rod movable lengthwise to swing said gripper outwardly and inwardly over the bottom of the last, a bell-crank lever having one arm connected to said overdraw rod for operating it, a cam for operating the other arm of said bell-crank lever to move the rod in one direction, and a spring arranged to move the rod in the opposite direction when permitted by the cam.

46. In a machine of the class described, the combination with a gripper and means for operating it to pull an upper over a last, of an overdraw rod movable lengthwise to swing said gripper outwardly and inwardly over the bottom of the last, a cam shaft extending substantially at right angles to said overdraw rod, a bell-crank lever for operating said rod, a cam on said cam shaft for operating said bell-crank lever to move the rod in one direction, and a spring arranged to act on said lever to move the rod in the opposite direction.

47. In a machine of the class described, the combination with a gripper mounted for movements in different directions to pull an upper over a last while gripping the upper, mechanism for driving fastenings to fasten the upper, and power-driven means for operating said gripper and fastening mechanism, of controlling means constructed for use at the will of the operator to eliminate all movements of the gripper without affecting the operation of the fastening mechanism.

48. In a machine of the class described, the combination with a gripper for pulling an upper over a last, mechanism for driving fastenings to fasten the upper, and power-driven means for operating said gripper and fastening mechanism comprising a plurality of cams for imparting different upper-pulling movements to the gripper after the gripper has gripped the upper, of means for controlling the fastening mechanism independently of said gripper cams to permit the use of the machine for driving fastenings while the gripper is idle.

49. In a machine of the class described, the combination with a gripper for pulling an upper over a last, and mechanism for driving fastenings to fasten the upper, of power-driven means for operating said gripper and fastening mechanism comprising a cam wheel having a plurality of cams thereon for imparting different movements to the gripper and another cam wheel for the fastening mechanism, and means for controlling said last-named cam wheel independently of the other to cause the machine to operate only for driving fastenings.

50. In a machine of the class described, the combination with a gripper for pulling an upper over a last, mechanism for driving fastenings to fasten the upper, and power-driven means for operating said gripper and fastening mechanism including a plurality of cams for imparting different movements to the gripper, of a clutch for controlling said gripper cams, a clutch for controlling the fastening mechanism, and means for actuating one of said clutches independently of the other.

51. In a machine of the class described, the combination with a gripper for pulling an upper over a last, mechanism for driving fastenings to fasten the upper, and power-driven means for operating said gripper and fastening mechanism including means for imparting to the gripper updraw and overdraw movements after the gripper has gripped the upper, of controlling means constructed for use at the will of the operator to cause the machine to drive fastenings without updraw or overdraw movements of the gripper.

52. In a machine of the class described, the combination with a gripper for pulling an upper over a last, mechanism for driving fastenings to fasten the upper, and power-driven means for operating said gripper and fastening mechanism, of a controlling member for starting the operation of the gripper, and a controlling member for starting the operation of the fastening mechanism, one of said controlling members being operatively movable either in response to the operative movement of the other controlling member or independently thereof.

53. In a machine of the class described, the combination with a gripper for pulling an upper over a last, mechanism for driving fastenings to fasten the upper, and power-driven means for operating said gripper and fastening mechanism, of separate clutches for controlling the gripper and the fastening mechanism respectively, a treadle for actuating the clutch for the gripper, and a treadle for actuating the clutch for the fastening mechanism, said last-named treadle being operatively movable either in response to the operative movement of the other treadle or independently thereof.

54. In a machine of the class described, the combination with a gripper for pulling an upper over a last, and mechanism for driving fastenings to fasten the upper, of a cam shaft, means fast on said cam shaft for operating the fastening mechanism, means on the cam shaft normally disconnected therefrom for operating the gripper, a clutch for connecting said last-named means to the cam shaft, and a clutch for controlling the cam shaft arranged to be actuated either independently of said first-named clutch or simultaneously therewith.

55. In a machine of the class described, the combination with a gripper for pulling an upper over a last, and mechanism for driving fastenings to fasten the upper, of power-driven means for operating said fastening mechanism, means normally disconnected from said operating means for the fastening mechanism for operating the gripper, and controlling means movable to start the fastening mechanism in operation without establishing a connection with the gripper-operating means.

56. In a machine of the class described, the combination with a gripper for pulling an upper over a last, and mechanism for driving fastenings to fasten the upper, of power-driven means for operating said gripper and fastening mechanism including cams for imparting different movements to the gripper, a clutch and a treadle for controlling said cams, and a second clutch and treadle for starting the fastening mechanism in operation either independently of the gripper cams or simultaneously with the actuation of the first clutch.

57. In a machine of the class described, the combination with means for pulling an upper over a last having thereon an insole provided with a rib on its bottom face, of an overlaying and fastening device movable to lay the margin of the upper inwardly against the rib of the insole and to drive a fastening through the upper and the rib, a normally stationary anvil member arranged to engage the rib to position the shoe prior to the overlaying operation and to clinch the fastening, said anvil member being so mounted as to permit it to swing about an axis in response to the pressure of the overlaying and fastening device, a spring against the resistance of which said member is thus movable, and a stop co-operating with said spring to determine the normal position of said member.

58. In a machine of the class described, the combination with means for pulling an upper over a last having thereon an insole provided with a welt-attaching rib, of an overlaying and fastening device movable to lay the margin of the upper inwardly against the rib of the insole and to drive a fastening through the upper and the rib, an anvil member arranged to engage the rib and to clinch the fastening, said anvil member being so mounted as to permit it to swing about an axis in response to the pressure of the overlaying and fastening device, a spring against the resistance of which said member is thus movable, means for varying the tension of said spring, and a stop co-operating with said spring to determine adjustably the normal position of said member.

59. In a machine of the class described, the combination with means for pulling an upper over a last, of a member for laying the margin of the upper inwardly over the insole, said member having a passage therein for guiding a staple into the shoe to fasten the upper to the insole, means including an inside former and an outside former for forming a staple, a driver for driving the staple, and a member in said passage for guiding the inner sides of the legs of the staple as the staple is being driven into the shoe, said guiding member being displaceable by the driver.

60. In a machine of the class described, the combination with means for pulling an upper over a last, of a member for laying the margin of the upper inwardly over the insole, said member having a passage therein for guiding a staple into the shoe to fasten the upper to the insole, a driver for driving the staple, means for forming a staple and for transferring it into the path of movement of the driver, and a spring-controlled guide member pivotally mounted in said overlaying member with its end portion engaging a wall of the staple-guiding passage and arranged to extend between the legs of the staple to guide said legs as the staple is being driven into the shoe, said guide member being displaceable by the driver substantially at the end of the staple-driving operation.

61. In a machine for progressively lasting shoes, the combination with work-positioning means, of a gripper for pulling different portions of upper materials over a last successively in different locations along the edge of the last bottom, and means for imparting to said gripper, preparatory to the gripping of the upper materials in each of said locations, movement first toward the bottom of the last and then movement in a different direction outwardly toward the edge of the last bottom.

62. In a machine for progressively lasting shoes, the combination with work-positioning means, of a gripper for pulling different portions of upper materials over a last successively in different locations along the edge of the last bottom, and means for imparting to said gripper, preparatory to the gripping of the upper materials in each of said locations, movement in paths in angular relation to each other comprising movement toward the bottom of the last to position one of the gripper jaws in close relation to the work at a distance from the edge of the last bottom and then movement outwardly toward the edge of the last bottom while maintaining said jaw close to the work to insure its proper engagement with the inner face of the margin of the upper materials.

63. In a machine for progressively lasting shoes, the combination with work-positioning means, of a gripper for pulling different portions of upper materials over a last successively in different locations along the edge of the last bottom, and means for imparting to said gripper, preparatory to the gripping of the upper materials in each of said locations, movement first in a direction substantially perpendicular to the bottom of the last to position one of the gripper jaws close to the work and then outwardly toward the edge of the last bottom while maintaining said jaw in close relation to the work to insure its proper engagement with the inner face of the margin of the upper materials.

64. In a machine for progressively lasting shoes, the combination with work-positioning means, of a gripper for pulling different portions of upper materials over a last successively in different locations along the edge of the last bottom in successive cycles of operations of the machine, and gripper-operating means comprising mechanism for imparting to the gripper in each cycle of operations of the machine movement toward the bottom of the last followed by movement outwardly toward the edge of the last bottom in a path at an angle to that of its first movemen preparatory to the gripping of the upper materials and then movement to pull said upper materials.

65. In a machine for progressively lasting shoes, the combination with work-positioning means, of a gripper for pulling different portions of upper materials over a last successively in different locations along the edge of the last bottom, and operating means comprising cams constructed and arranged respectively to impart to said gripper, preparatory to the gripping of the upper materials in each of said locations, movements in paths in angular relation to each other comprising a movement toward the bottom of the last with the gripper jaws located at a substantial distance inwardly from the edge of the last bottom and then a movement to carry said jaws outwardly toward the edge of the last bottom while said jaws are open to receive the upper materials.

66. In a machine for progressively lasting shoes, the combination with means for positioning a last with shoe materials thereon including an upper and an insole provided with a rib on its outer face, of a gripper for pulling different portions of the upper materials over the last successively in different locations along the edge of the last bottom, and means for imparting to said gripper, preparatory to the gripping of the upper materials in each of said locations, movement toward the outer face of the insole to position one of the gripper jaws close to said face in a location farther inwardly from the edge of the insole than the rib and then movement to carry said jaw outwardly toward the edge of the insole in such a path as to clear the rib.

67. In a machine for progressively lasting shoes, the combination with means for positioning a last with shoe materials thereon including an upper and an insole provided with a rib on its outer face, of a gripper for pulling different portions of the upper materials over the last successively in different locations along the edge of the last bottom, and means for imparting to said gripper, preparatory to the gripping of the upper materials in each of said locations, movement toward the outer face of the insole to position one of the gripper jaws close to said face in a location farther inwardly from the edge of the insole than the rib and then movement to carry said jaw outwardly toward the edge of the insole with a component of movement away from the outer face of the insole to clear the rib and then a component of movement toward said face outside of the rib.

68. In a machine for progressively lasting shoes, the combination with a work rest for positioning a last with shoe materials thereon bottom upward for lasting operations successively in different locations along the edge of the last bottom, of a gripper for pulling different portions of the upper materials over the last successively in the different locations in successive cycles of operations of the machine, and gripper-operating means comprising mechanism for imparting to the gripper at the beginning of each cycle of operations downward movement toward the bottom of the last and thereafter movement outwardly toward the edge of the last bottom to insure proper engagement of the gripper with the inner face of the margin of the upper materials.

69. In a machine for progressively lasting shoes, the combination with work-positioning means, of a gripper for pulling different portions of upper materials over a last successively in different locations along the edge of the last bottom, means for imparting to said gripper in each of said locations upper-pulling movement in a direction heightwise of the last, and mechanism operative independently of said movement of the gripper for imparting to the gripper in automatically determined time relation to that movement a movement in a direction to pull the upper outwardly from the side of the last.

70. In a machine for progressively lasting shoes, the combination with work-positioning means, of a gripper for pulling different portions of upper materials over a last successively in different locations along the edge of the last bottom, and devices automatically operative in time relation to each other respectively to impart to the gripper in each of said locations upper-pulling movement heightwise of the last and movement to pull the upper outwardly from the side of the last.

71. In a machine for progressively lasting shoes, the combination with work-positioning means, of a gripper for pulling different portions of upper materials over a last successively in different locations along the edge of the last bottom, and cams automatically operative respectively to impart to the gripper in each of said locations updraw movement heightwise of the last and movement to pull the upper outwardly from the side of the last during the updraw.

72. In a machine for progressively lasting shoes, the combination with work-positioning means, of a gripper for pulling different portions of upper materials over a last successively in different locations along the edge of the last bottom, means for imparting to the gripper in each of said locations updraw movement heightwise of the last, and means for imparting to the gripper, preparatory to its updraw movement, movement outwardly toward the edge of the last bottom into upper-gripping position and thereafter movement farther outwardly at the time of the updraw to cause the gripper to pull the upper in a direction to space it from the side of the last adjacent to the edge of the last bottom.

73. In a machine for progressively lasting shoes, the combination with work-positioning means, of a gripper for pulling different portions of upper materials over a last successively in different locations along the edge of the last bottom in successive cycles of operations of the machine, means for imparting to the gripper in each cycle of operations upper-pulling movement heightwise of the last, and means for also imparting to the gripper in each cycle movement outwardly toward the edge of the last bottom into upper-gripping position and thereafter movement farther outwardly in automatically determined time relation to its upper-pulling movement heightwise of the last.

74. In a machine for progressively lasting shoes, the combination with work-positioning means, of a gripper for pulling different portions of an upper over a last successively in different locations along the edge of the last bottom, said gripper being mounted for overdrawing movement about an axis so arranged as to cause the gripper jaws to approach the bottom face of the last during the overdraw, and means movable in a direction inclined at an angle to the bottom face of the last to engage the margin of the upper at a substantial distance from the edge of the last bottom and to lay it over the last bottom in automatically determined time relation to the overdrawing action of the gripper thereon.

75. In a machine for progressively lasting shoes, the combination with work-positioning means, of a gripper for pulling different portions of an upper over a last and over an insole on the last successively in different locations along the edge of the last bottom, said gripper being mounted for overdrawing movement about an axis so arranged as to cause the gripper jaws to approach the bottom face of the insole during the overdraw, a nozzle guide for fastenings movable in a direction inclined at an angle to the bottom face of the insole to engage the margin of the upper at a distance from the edge of the insole and to lay it upon said bottom face in automatically determined time relation to the overdrawing action of the gripper, and means for driving from said nozzle guide a fastening to fasten the upper to the insole in each lasting location.

76. In a machine for progressively lasting shoes, the combination with means for positioning for successive lasting operations a last having thereon an upper and an insole provided with a rib on its bottom face, of a gripper for pulling different portions of the upper over the last successively in different locations along the edge of the last bottom, said gripper being mounted for overdrawing movement about an axis so arranged as to cause the gripper jaws to approach the bottom face of the insole during the overdraw, a staple-guiding nozzle movable in a direction at an angle to the bottom face of the insole to engage the margin of the upper at a distance from the edge of the insole and to press it into the angle between the feather and the rib in time relation to the overdrawing action of the gripper, and means for driving a staple from said nozzle through the upper and the rib to fasten the upper in each lasting location.

In testimony whereof I have signed my name to this specification.

GEORGE GODDU.